United States Patent
Hikosaka et al.

(10) Patent No.: US 11,914,231 B2
(45) Date of Patent: Feb. 27, 2024

(54) LENS, LENS BLANK, AND EYEWEAR

(71) Applicant: Mitsui Chemicals, Inc., Tokyo (JP)

(72) Inventors: Eiichiro Hikosaka, Nagoya (JP);
Yoshinobu Okada, Niihama (JP);
Akifumi Aono, Nagoya (JP)

(73) Assignee: Mitsui Chemicals, Inc., Tokyo (JP)

( * ) Notice: Subject to any disclaimer, the term of this patent is extended or adjusted under 35 U.S.C. 154(b) by 588 days.

(21) Appl. No.: 17/280,205

(22) PCT Filed: Sep. 26, 2019

(86) PCT No.: PCT/JP2019/037935
§ 371 (c)(1),
(2) Date: Mar. 26, 2021

(87) PCT Pub. No.: WO2020/067329
PCT Pub. Date: Apr. 20, 2020

(65) Prior Publication Data
US 2021/0341759 A1 Nov. 4, 2021

(30) Foreign Application Priority Data
Sep. 28, 2018 (JP) .................................. 2018-185321

(51) Int. Cl.
*G02C 7/08* (2006.01)
*G02C 7/06* (2006.01)

(52) U.S. Cl.
CPC .............. *G02C 7/083* (2013.01); *G02C 7/06* (2013.01)

(58) Field of Classification Search
CPC ...... G02C 7/083; G02C 7/06; G02C 2202/20; G02B 3/10; G02F 1/13
See application file for complete search history.

(56) References Cited

U.S. PATENT DOCUMENTS

2009/0046349 A1 2/2009 Haddock
2013/0037202 A1* 2/2013 Ando .................... G02F 1/1341
156/99

FOREIGN PATENT DOCUMENTS

JP 4322214 A 11/1992
JP 2010532496 A 10/2010
JP 2011158634 A 8/2011

OTHER PUBLICATIONS

International Search Report from International Application No. PCT/JP2019/037935 dated Oct. 29, 2019.

* cited by examiner

*Primary Examiner* — James C. Jones
(74) *Attorney, Agent, or Firm* — Shih IP Law Group, PLLC

(57) ABSTRACT

This lens is provided with: a transparent first substrate; a transparent second substrate provided facing the first substrate in the thickness direction of the first substrate; a first optical characteristic varying portion which is provided between the first substrate and the second substrate, and which has an optical characteristic which is varied by means of electric control; and a second optical characteristic varying portion which is provided between the first substrate and the second substrate, is provided displaced with respect to the first optical characteristic varying portion in the thickness direction, and which has a optical characteristic which is varied by means of electric control.

14 Claims, 21 Drawing Sheets

LENS, LENS BLANK, AND EYEWEAR

TECHNICAL FIELD

The present invention relates to a lens, a lens blank, and an eyewear.

BACKGROUND ART

In recent years, development of electronic devices that can be worn by users has been proceeding. Examples of the electronic devices include an eyewear (for example, electronic glasses) having regions of which the optical power can be changed by voltage (see PTL 1).

Each lens of the above-described eyewear includes a transparent first substrate in which a transparent first electrode is disposed on one surface, a transparent second substrate in which a transparent second electrode is disposed on one surface, and a liquid crystal layer disposed between the first electrode and the second electrode. Specifically, a diffraction region having a plurality of concentric ridges is provided in at least part of the first substrate. The liquid crystal layer is disposed so as to face the diffraction region in a thickness direction of the first substrate.

The liquid crystal layer is configured to change its refractive index in accordance with whether a voltage is applied. As the refractive index of the liquid crystal layer changes according to whether a voltage is applied to the liquid crystal layer, the optical power of a portion (hereinafter, referred to as "optical property changeable portion") corresponding to the liquid crystal layer in the lens changes. With such an existing structure, the lens is capable of realizing an optical power in a state where no voltage is applied to the liquid crystal layer and an optical power in a state where a voltage is applied to the liquid crystal layer.

CITATION LIST

Patent Literature

PTL 1
  Japanese Unexamined Patent Application Publication (Translation of PCT Application) No. 2010-532496

SUMMARY OF THE INVENTION

Technical Problem

For such lenses, a technology for increasing different realizable optical powers has been desired.

The present invention is contemplated in view of the above-described situation, and it is a task to provide a technology for making it possible to increase different realizable optical powers.

Solution to Problem

A lens according to one aspect of the present invention includes: a first substrate which is transparent; a second substrate provided so as to face the first substrate in a thickness direction of the first substrate, the second substrate being transparent; a first optical property changeable portion that is provided between the first substrate and the second substrate, in which an optical property of the first optical property changeable portion is changed by electrical control; and a second optical property changeable portion provided between the first substrate and the second substrate and provided so as to be shifted from the first optical property changeable portion in the thickness direction, in which an optical property of the second optical property changeable portion is changed by electrical control.

A lens blank according to an aspect of the present invention includes a blank portion, and the above-described lens formed integrally with the blank portion.

An eyewear according to an aspect of the present invention includes the above-described lens, a frame that holds the lens, and a control section that controls a voltage applied to the first optical property changeable portion and a voltage applied to the second optical property changeable portion.

Advantageous Effects of Invention

According to the present invention, it is possible to increase different realizable optical powers.

DESCRIPTION OF EMBODIMENTS

Some embodiments of the present invention will be described in detail with reference to the drawings. Like reference signs are assigned to the same elements throughout the specification unless otherwise noted. The content described below together with the attached drawings is intended to illustrate example embodiments and is not intended to describe a sole embodiment.

Embodiment 1

Hereinafter, the configuration of a lens according to Embodiment 1 of the present invention will be described. The lens according to the present embodiment is incorporated into an eyewear, for example, electronic glasses G shown in FIG. 1, or the like.

Figure 1:
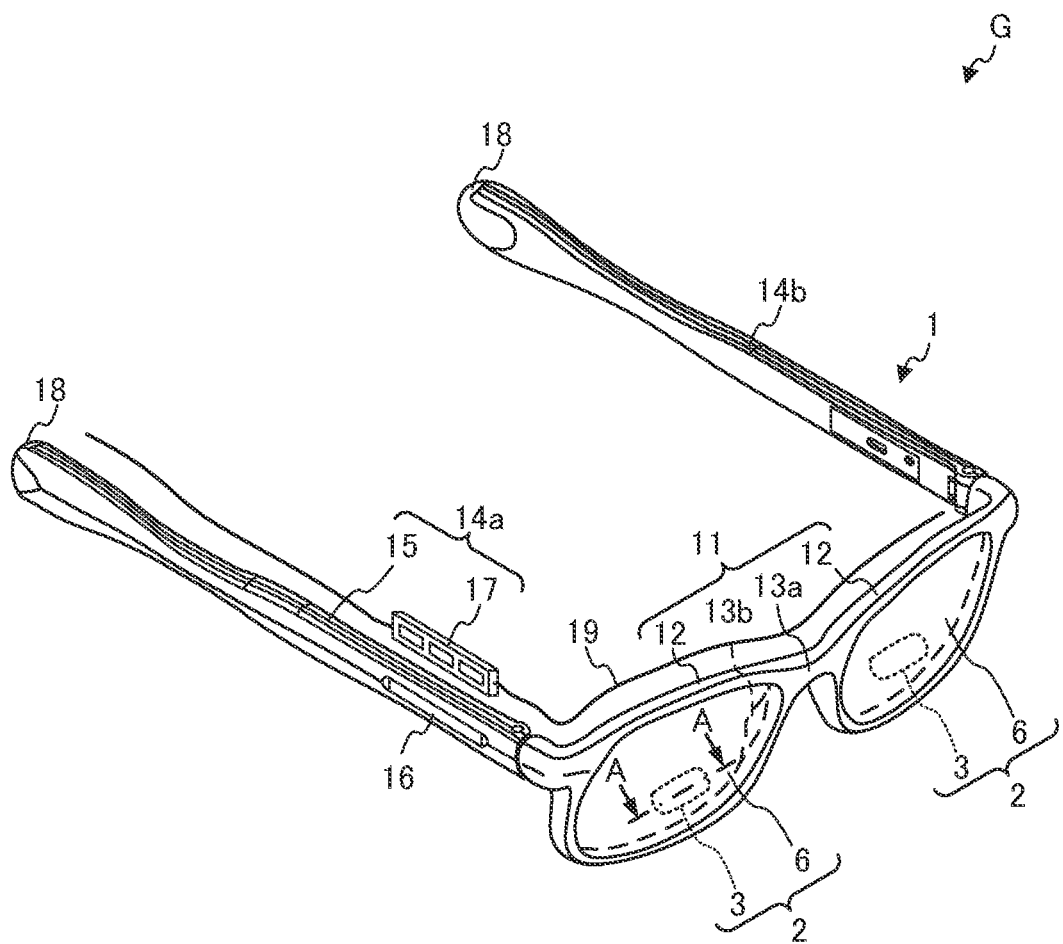
FIG. 1 is a perspective view of electronic glasses.
Figure 2:
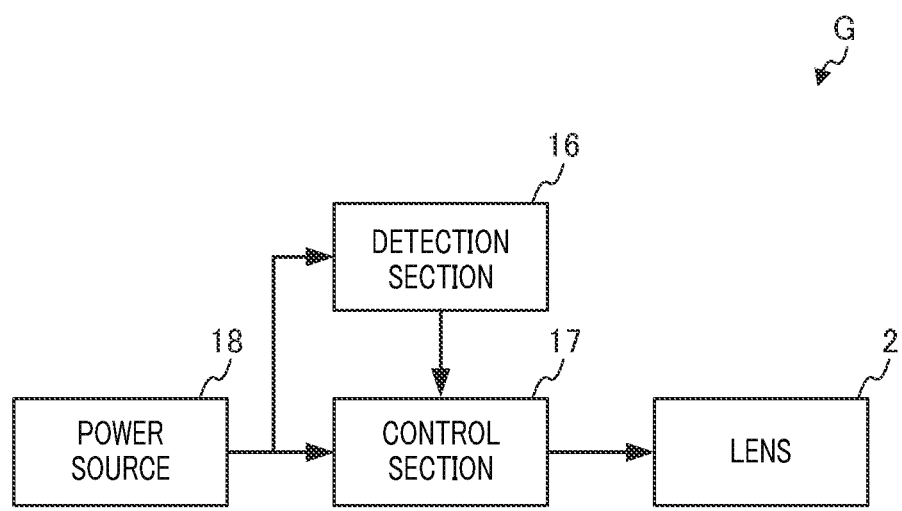
FIG. 2 is a block diagram of an internal circuit of the electronic glasses.

FIG. 1 is a perspective view of electronic glasses G. FIG. 2 is a block diagram of an internal circuit of the electronic glasses G.

Electronic Glasses

Electronic glasses G include frame 1, a pair of lenses 2, detection section 16, control section 17, power supplies 18, and the like. Frame 1 has front 11 and a pair of temples 14a, 14b. In the following description, a portion where front 11 is disposed will be described as the front (front side) of electronic glasses G. FIG. 1 shows right-side temple 14a as an exploded view.

In the following description of electronic glasses G and the component members of electronic glasses G, "front and rear direction", "width direction", and "upper and lower direction" mean the directions of electronic glasses G in an unfolded state where a user can wear electronic glasses G as glasses (the state shown in FIG. 1) unless otherwise noted. Specifically, the front and rear direction of electronic glasses G is the front and rear direction of a user wearing electronic glasses G. A view of electronic glasses G from the front side of electronic glasses G corresponds to the front view of electronic glasses G and component members of electronic glasses G.

The width direction of electronic glasses G is the right and left direction of a user wearing electronic glasses G. The upper and lower direction of electronic glasses G is the top and bottom direction of a user wearing electronic glasses G. In the following description of lens 2 and the component members of lens 2, "thickness direction" coincides with the front and rear direction of electronic glasses G.

A user (wearer) of electronic glasses G changes the optical property (light transmittance resulting from changing the optical power, refractive index, or color) of at least one changeable portion (hereinafter, referred to as "target changeable portion") of first property changeable portion 40 and second property changeable portion 50 in first region 3 of lens 2 (described later) by operating (for example, touch operation) detection section 16 provided on frame 1. Here, the optical power changes when the refractive index is changed. First property changeable portion 40 may be regarded as corresponding to an example of a first optical property changeable portion, and second property changeable portion 50 may be regarded as corresponding to an example of a second optical property changeable portion. Alternatively, first property changeable portion 40 may be regarded as corresponding to an example of a second optical property changeable portion, and second property changeable portion 50 may be regarded as corresponding to an example of a first optical property changeable portion.

When detection section 16 is operated by a user, control section 17 switches between a state where a voltage is applied to the target changeable portion (hereinafter, referred to as "voltage application state") and a state where no voltage is applied (hereinafter, referred to as "voltage non-application state") based on the operation.

Lens

Figure 3:
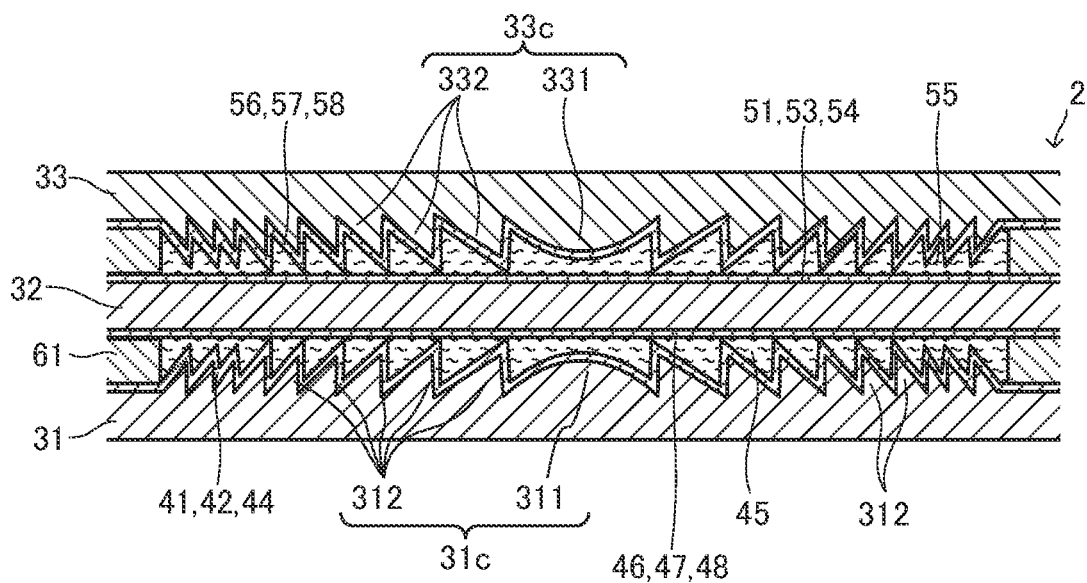
FIG. 3 is a cross-sectional view showing an example of the configuration of a lens according to Embodiment 1.
Figure 4:
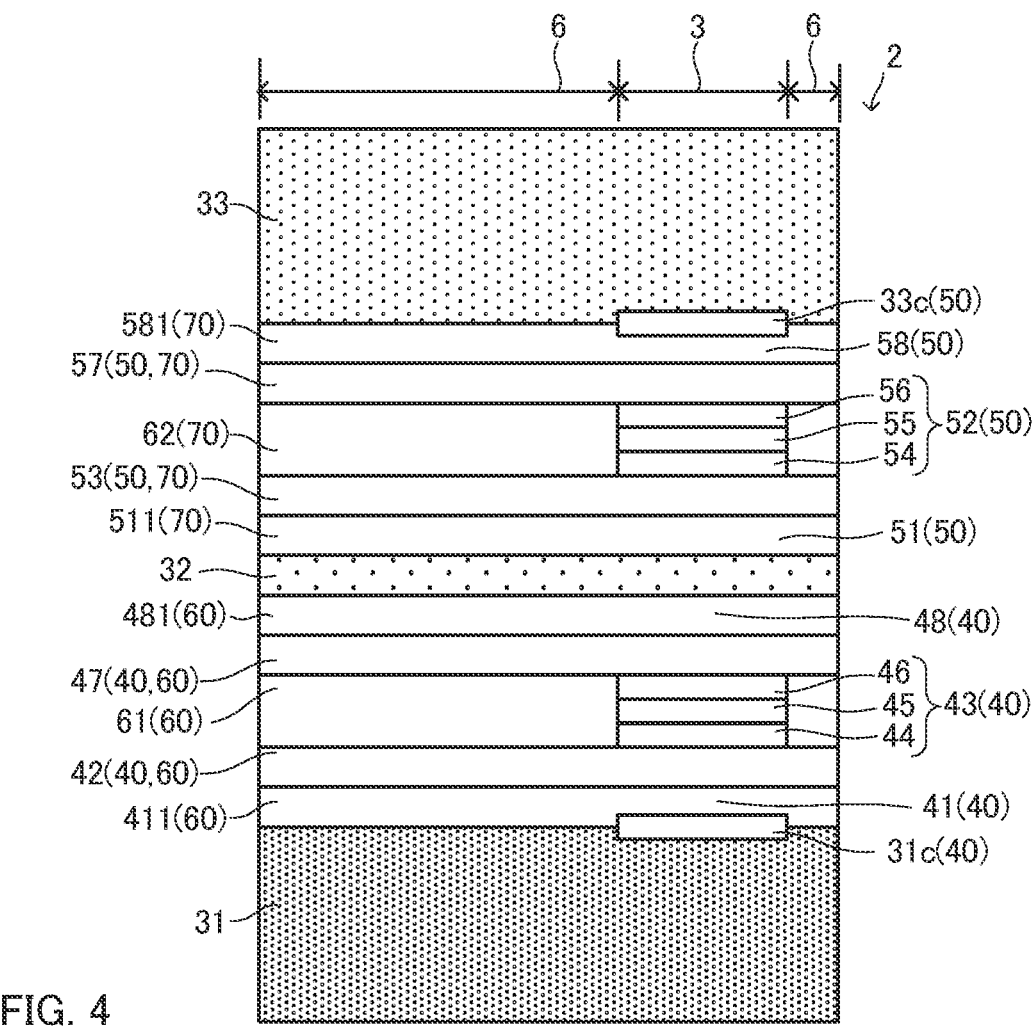
FIG. 4 is a schematic diagram showing an example of the layer structure of the lens.

FIG. 3 is a schematic cross-sectional view showing an example of the configuration of lens 2. FIG. 3 is a cross-sectional view taken along the line A-A in FIG. 1. FIG. 4 is a schematic diagram showing an example of the layer structure of the configuration of the lens. In FIG. 3, only reference signs are shown for some elements of lens 2 shown in FIG. 4.

Figure 5A:
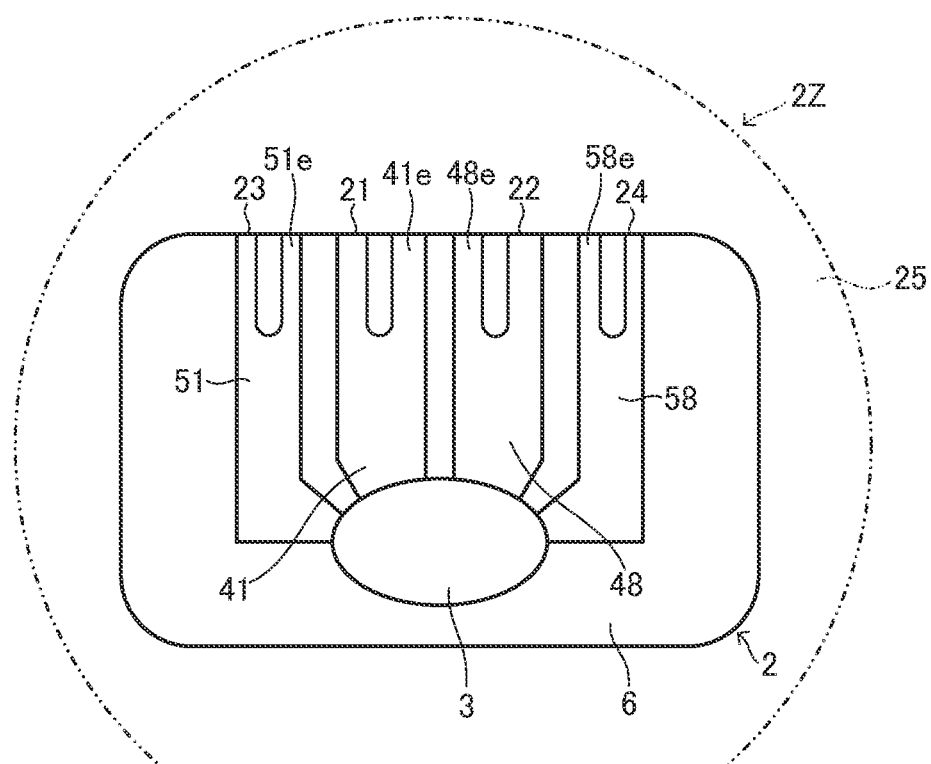
FIG. 5A is a front schematic diagram of the lens for illustrating arrangement of electrodes.

Lens 2 is made by applying post-processing to lens blank 2Z (also referred to as semifinished lens; see FIG. 5A). Lens blank 2Z has lens 2 and blank portion 25 (see the alternate long and two-short dashed line in FIG. 5A) provided integrally with lens 2.

Blank portion 25 is provided outside lens 2 so as to surround lens 2. The configuration of blank portion 25 is the same as, for example, the configuration of second region 6 of lens 2 (described later). By applying post-processing to lens blank 2Z, lens 2 having a desired outer shape and size is obtained by processing lens blank 2Z into a desired shape and size. Post-processing may include outer shape machining of machining lens blank 2Z into the outer shape of lens 2 by applying cutting and polishing to the outer periphery of lens blank 2Z. Post-processing may include back surface processing of machining lens blank 2Z into the thickness dimension of lens 2 by applying cutting and polishing to the back surface of lens blank 2Z.

The pair of lenses 2 is formed bilaterally symmetric when electronic glasses G are viewed from the front, and has the same component elements as each other. Accordingly, in the following description, lens 2 of electronic glasses G for the right eye will be described, and the description of the component elements of lens 2 for the left eye is omitted. The following description of lens 2 may be used as needed for the description of lens blank 2Z.

Lens 2 has first region (electrically activated region) 3 capable of changing its optical power by voltage and second region 6 disposed in a region other than first region 3.

The shape, size, and position of first region 3 may be designed as needed according to the size of lens 2, the usage of lens 2, and the like. Lens 2 may be at least one of, for example, a distance-near lens, an intermediate-near lens, and a near-near lens. As shown in FIG. 1, first region 3 may be disposed on the lower side of the center of lens 2 when lens 2 is viewed from the front.

First Region

As shown in FIG. 3 and FIG. 4, first region 3 includes first substrate 31, first property changeable portion 40, intermediate substrate 32, second property changeable portion 50, second substrate 33, and the like in order from the rear side (lower side in FIG. 3). The elements of first region 3 have translucency for visible light.

First region 3 has substantially the same optical power as the optical power of second region 6 in the voltage non-application state where no voltage is applied to first property changeable portion 40 and second property changeable portion 50.

On the other hand, first region 3 has an optical power different from the optical power of second region 6 in the voltage application state where a voltage is applied to at least one of first property changeable portion 40 and second property changeable portion 50. Hereinafter, a state where a voltage is applied to only first property changeable portion 40 is referred to as first voltage application state. A state where a voltage is applied to only second property changeable portion 50 is referred to as second voltage application state. A state where a voltage is applied to first property changeable portion 40 and second property changeable portion 50 is referred to as third voltage application state.

First region 3 has optical powers respectively corresponding to the voltage non-application state, the first voltage application state, the second voltage application state, and the third voltage application state.

First Substrate

First substrate 31 is disposed at the rearmost side (user side) in lens 2. First substrate 31 is a transparent optical element having a pair of main surfaces (a front surface and a back surface). First substrate 31 may have a disc shape that curves in a convex shape toward one side (front side) in a thickness direction of first substrate 31 (hereinafter, simply referred to as "thickness direction"). The thickness direction of first substrate 31 coincides with the thickness direction in the elements of lens 2.

The front surface and back surface of first substrate 31 each may be a convex curved surface that curves in a convex shape toward one side (front side) in the thickness direction. First substrate 31 includes first diffraction structure 31c in a region corresponding to first region 3 on the front surface.

As shown in FIG. 3, first diffraction structure 31c has spherical crown convex portion 311 at the center portion of the front surface. Convex portion 311 has a circular shape in front view. The central position of convex portion 311 coincides with the central position of first diffraction structure 31c (first region 3) in front view.

First diffraction structure 31c has a plurality of annular ridges 312 outside convex portion 311. First diffraction structure 31c has a plurality of annular grooves each provided between any adjacent ridges 312. First diffraction structure 31c is made up of the plurality of ridges 312 and the plurality of grooves formed concentrically and alternately. The ridge lines of the plurality of ridges 312 are provided concentrically about the center of convex portion 311 (which is also the center of first diffraction structure 31c). The diameters of the ridge lines of the plurality of ridges 312 increase with distance from convex portion 311.

On the other hand, among the plurality of ridges 312, a distance (also referred to as pitch) between the ridge lines of adjacent ridges 312 reduces with distance from convex portion 311. Each ridge 312 may have an annular shape continuous all around in a circumferential direction or may have a partially annular shape. In front view, the central position of convex portion 311 and the central position of first diffraction structure 31c may be different from each other. As the pitch between the ridge lines of adjacent ridges 312 reduces, the optical power of first property changeable portion 40 applied with a voltage increases.

Such first substrate 31 is made of inorganic glass or organic glass. First substrate 31 is preferably made of organic glass. The organic glass is any one of a thermoset material made of thermoset polyurethanes, polythiourethanes, polyepoxides, or polyepisulfides, a thermoplastic material made of poly(meth)acrylates, and a (cross-linked) thermoset material made of a copolymer or mixture of these materials. Alternatively, the organic glass may be, for example, a thermoplastic material containing polycarbonates or thermoplastic polyurethanes. Alternatively, the organic glass may be a diethyleneglycol-bis-allylcarbonate polymer or copolymer.

First substrate 31 may have a coating layer (not shown) on its back surface. The coating layer provided on the back surface of first substrate 31 may be regarded as part of first substrate 31. First diffraction structure 31c may be provided on the back surface of intermediate substrate 32 (described later).

First Property Changeable Portion

First property changeable portion 40 includes above-described first diffraction structure 31c, first electrode 41, insulating film 42, first liquid crystal module 43, insulating film 47, second electrode 48, and the like, in order from the rear side.

First property changeable portion 40 has a predetermined optical power (hereinafter, referred to as "first optical power") in a state where a voltage is applied to first liquid crystal layer 45. The first optical power may be set according to the state of user's eye.

First Electrode

First electrode 41 is provided on the front surface of first substrate 31. Another member may be provided between first electrode 41 and first substrate 31. First electrode 41 may be regarded as being provided between first substrate 31 and first liquid crystal layer 45 in the thickness direction.

First electrode 41 may be provided in at least a range (first region 3) in which a voltage can be applied to first liquid crystal layer 45. In other words, first electrode 41 does not need to be provided in second region 6 as long as a voltage can be applied to first liquid crystal layer 45.

First electrode 41 is a transparent electrode having translucency. The material of first electrode 41 is, for example, indium tin oxide (ITO) or zinc oxide (ZnO).

Figure 5B:
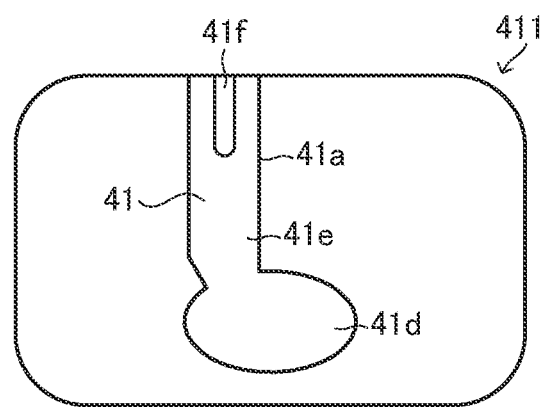
FIG. 5B is a schematic diagram of a first electrode.

In the case of the present embodiment, first electrode 41 is made up of part of transparent conductive film 411 provided all over the front surface of first substrate 31. Specifically, as shown in FIG. 5B, first electrode 41 is a portion surrounded by slit 41a formed in transparent conductive film 411.

First electrode 41 is made up of voltage application portion 41d and connecting portion 41e. Voltage application portion 41d faces first liquid crystal layer 45 in the thickness direction. A first end of connecting portion 41e is exposed to the outside at first portion 21 of the outer peripheral surface of lens 2. First portion 21 is present in the upper half of the outer peripheral surface of lens 2. A second end of connecting portion 41e is connected to voltage application portion 41d.

Connecting portion 41e has thick portion 41f thicker than the other portion at the first end. Such thick portion 41f increases a contact area with a conductive member (not shown) provided in front 11. Such first electrode 41 is connected to power supplies 18 via the above-described conductive member and wire 19.

Insulating Film

Insulating film 42 is provided on at least the front surface of first electrode 41. Insulating film 42 may be regarded as being provided between first electrode 41 and first liquid crystal module 43. In the case of the present embodiment, insulating film 42 is provided all over the front surface of transparent conductive film 411.

Insulating film 47 is provided on the back surface of second electrode 48. Insulating film 47 may be regarded as being provided between second electrode 48 and first liquid crystal module 43. In the case of the present embodiment, insulating film 47 is provided all over the back surface of transparent conductive film 481.

The material of insulating film 42 and insulating film 47 may be a known material that can be used as an insulating layer having translucency. The material of the insulating layer is, for example, silicon dioxide.

First Liquid Crystal Module

First liquid crystal module 43 includes alignment film 44, first liquid crystal layer 45, alignment film 46, and the like, in order from the rear side.

Alignment Film

Alignment film 44 is provided on the back surface of first liquid crystal layer 45. Alignment film 44 is provided all over the back surface of first liquid crystal layer 45. Such alignment film 44 controls the alignment state of the liquid crystal material in first liquid crystal layer 45.

Alignment film 46 is provided on the front surface of first liquid crystal layer 45. Alignment film 46 is provided all over the front surface of first liquid crystal layer 45. Such alignment film 46 controls the alignment state of the liquid crystal material in first liquid crystal layer 45. The material of alignment film 44 and alignment film 46 may be a known material that can be used as an alignment film for liquid crystal material. The material of alignment film 44 and alignment film 46 is, for example, polyimide.

First Liquid Crystal Layer

First liquid crystal layer 45 is provided between alignment film 44 and alignment film 46. First liquid crystal layer 45 may be regarded as being provided between first electrode 41 and second electrode 48. Such first liquid crystal layer 45 contains liquid crystal material. The alignment state of the liquid crystal material changes in accordance with whether a voltage is applied. As the alignment state of first liquid crystal layer 45 changes, the optical property (for example, refractive index or transmittance) of first liquid crystal layer 45 changes. The liquid crystal material may be, for example, cholesteric liquid crystal, nematic liquid crystal, or guest-host liquid crystal.

Second Electrode

Second electrode 48 is provided on the back surface of intermediate substrate 32. Another member may be provided between second electrode 48 and intermediate substrate 32. Second electrode 48 may be regarded as being provided between intermediate substrate 32 and first liquid crystal layer 45 in the thickness direction.

Second electrode 48 may be provided in at least a range (first region 3) in which a voltage can be applied to first liquid crystal layer 45. In other words, second electrode 48 does not need to be provided in second region 6 as long as a voltage can be applied to first liquid crystal layer 45.

Second electrode 48 is a transparent electrode having translucency. The material of second electrode 48 is, for example, indium tin oxide (ITO) or zinc oxide (ZnO).

Figure 5C:
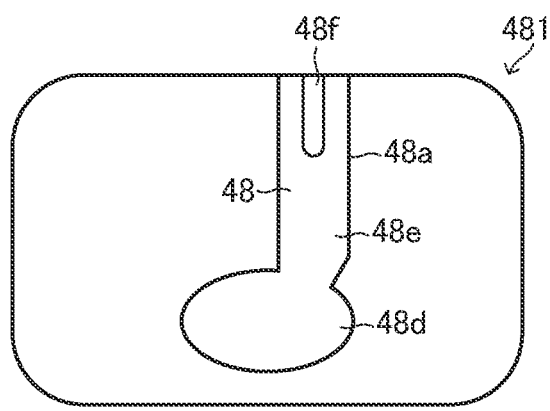
FIG. 5C is a schematic diagram of a second electrode.

In the case of the present embodiment, second electrode 48 is made up of part of transparent conductive film 481 provided all over the back surface of intermediate substrate 32. Specifically, as shown in FIG. 5C, second electrode 48 is a portion surrounded by slit 48a formed in transparent conductive film 481.

Second electrode 48 is made up of voltage application portion 48d and connecting portion 48e. Voltage application portion 48d faces first liquid crystal layer 45 in the thickness direction. Voltage application portion 48d faces voltage application portion 41d of first electrode 41 in the thickness direction.

A first end of connecting portion 48e is exposed to the outside at second portion 22 of the outer peripheral surface of lens 2. Second portion 22 of lens 2 does not face first portion 21 of lens 2 in the thickness direction. Second portion 22 is present in the upper half of the outer peripheral surface of lens 2.

A second end of connecting portion 48e is connected to voltage application portion 48d. Connecting portion 48e does not face connecting portion 41e of first electrode 41 in the thickness direction.

Connecting portion 48e has thick portion 48f thicker than the other portion at the first end. Such thick portion 48f increases a contact area with a conductive member (not shown) provided in front 11. Above-described second electrode 48 is connected to power supplies 18 via the above-described conductive member and a power cable.

Intermediate Substrate

Intermediate substrate 32 is provided between first property changeable portion 40 and second property changeable portion 50 in lens 2. Intermediate substrate 32 is an optical element made up of a transparent sheet member having a pair of main surfaces (a front surface and a back surface). Intermediate substrate 32 may have a disc shape that curves in a convex shape toward one side (front side) in the thickness direction. Intermediate substrate 32 corresponds to an example of a third substrate. The material of such intermediate substrate 32 is similar to the material of first substrate 31.

The intermediate substrate may be, for example, any one of a substrate having a photochromic property, a colored substrate, such as a colored lens, a substrate having a polarization property, a substrate having a blue light cut function, and a functional substrate, such as a neo contrast lens.

Second Property Changeable Portion

Second property changeable portion 50 includes third electrode 51, insulating film 53, second liquid crystal module 52, insulating film 57, fourth electrode 58, second diffraction structure 33c, and the like, in order from the rear side. Such second property changeable portion 50 faces first property changeable portion 40 in the thickness direction. Second property changeable portion 50 is provided so as to be shifted in the thickness direction (in other words, provided in a different layer) from first property changeable portion 40. Particularly, in the case of the present embodiment, second property changeable portion 50 and first property changeable portion 40 have the same shape in front view. Alternatively, second property changeable portion 50 and first property changeable portion 40 may have different shapes in front view. Second property changeable portion 50 and first property changeable portion 40 do not need to face in the thickness direction, which is not shown in the drawing.

Second property changeable portion 50 has a predetermined optical power (hereinafter, referred to as "second optical power") in a state where a voltage is applied to second liquid crystal layer 55. The second optical power may be set according to the state of user's eye.

The second optical power may be the same or may be different from the first optical power. The second optical power may be greater than or may be less than the first optical power.

When the absolute value of the first optical power is greater than the absolute value of the second optical power, the area of first property changeable portion 40 in front view may be less than the area of second property changeable portion 50 in front view. When the absolute value of the first optical power is less than the absolute value of the second optical power, the area of first property changeable portion 40 in front view may be greater than the area of second property changeable portion 50 in front view.

Third Electrode

Third electrode 51 is provided on the front surface of intermediate substrate 32. Another member may be provided between third electrode 51 and intermediate substrate 32. Third electrode 51 may be regarded as being provided between intermediate substrate 32 and second liquid crystal layer 55 in the thickness direction.

Third electrode 51 just needs to be provided in at least a range (first region 3) in which a voltage can be applied to second liquid crystal layer 55. In other words, third electrode 51 does not need to be provided in second region 6 as long as a voltage can be applied to second liquid crystal layer 55.

Third electrode 51 is a transparent electrode having translucency. The material of third electrode 51 is, for example, indium tin oxide (ITO) or zinc oxide (ZnO).

Figure 5D:
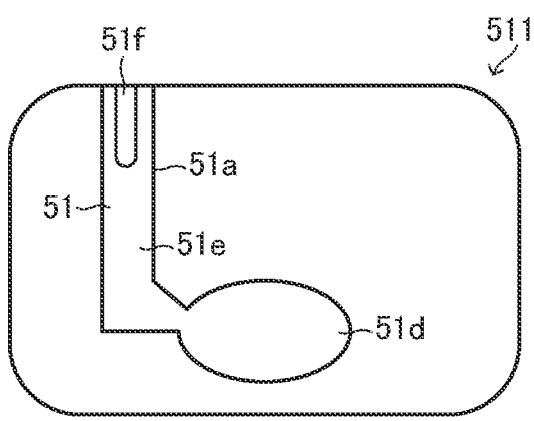
FIG. 5D is a schematic diagram of a third electrode.

In the case of the present embodiment, third electrode 51 is made up of part of transparent conductive film 511 provided all over the front surface of intermediate substrate 32. Specifically, as shown in FIG. 5D, third electrode 51 is a portion surrounded by slit 51a formed in transparent conductive film 511.

Third electrode 51 is made up of voltage application portion 51d and connecting portion 51e. Voltage application portion 51d faces second liquid crystal layer 55 in the thickness direction. Voltage application portion 51d faces voltage application portion 58d of fourth electrode 58 in the thickness direction.

A first end of connecting portion 51e is exposed to the outside at third portion 23 of the outer peripheral surface of lens 2. Third portion 23 does not face first portion 21 or second portion 22 in the thickness direction. Third portion 23 is present in the upper half of the outer peripheral surface of lens 2. A second end of connecting portion 51e is connected to voltage application portion 51d.

Connecting portion 51e has thick portion 51f thicker than the other portion at the first end. Such thick portion 51f increases a contact area with a conductive member (not shown) provided in front 11. Above-described third electrode 51 is connected to power supplies 18 via the above-described conductive member and a power cable.

Insulating Film

Insulating film 53 is provided on the front surface of third electrode 51. Insulating film 53 may be regarded as being provided between third electrode 51 and second liquid crystal module 52. Insulating film 53 is provided all over the front surface of transparent conductive film 511. The material of such insulating film 53 is similar to the material of above-described insulating film 42.

Insulating film 57 is provided on the back surface of fourth electrode 58. Insulating film 57 is provided all over the back surface of transparent conductive film 581 (described later). The material of such insulating film 57 is similar to the material of above-described insulating film 42.

Second Liquid Crystal Module

First liquid crystal module 52 includes alignment film 54, second liquid crystal layer 55, alignment film 56, and the like, in order from the rear side.

Alignment Film

Alignment film 54 is provided on the back surface of second liquid crystal layer 55. Alignment film 54 is provided all over the back surface of second liquid crystal layer 55. Such alignment film 54 controls the alignment state of the liquid crystal material in second liquid crystal layer 55. The material of alignment film 54 is similar to the material of above-described alignment film 44.

Alignment film 56 is provided on the front surface of second liquid crystal layer 55. Alignment film 56 is provided all over the front surface of second liquid crystal layer 55. Such alignment film 56 controls the alignment state of the liquid crystal material in second liquid crystal layer 55. The material of alignment film 56 is similar to the material of above-described alignment film 44.

Second Liquid Crystal Layer

Second liquid crystal layer 55 is provided between alignment film 54 and alignment film 56. Second liquid crystal layer 55 may be regarded as being provided between third electrode 51 and fourth electrode 58. Such second liquid crystal layer 55 contains liquid crystal material. The alignment state of the liquid crystal material changes in accordance with whether a voltage is applied. As the alignment state of second liquid crystal layer 55 changes, the optical property (refractive index) of second liquid crystal layer 55 changes. The liquid crystal material may be, for example, cholesteric liquid crystal or nematic liquid crystal.

Fourth Electrode

Fourth electrode 58 is provided on the back surface of second substrate 33. Another member may be provided between fourth electrode 58 and second substrate 33. Fourth electrode 58 may be regarded as being provided between second substrate 33 and second liquid crystal layer 55 in the thickness direction.

Fourth electrode 58 may be provided in at least a range (first region 3) in which a voltage can be applied to second liquid crystal layer 55. In other words, fourth electrode 58 does not need to be provided in second region 6 as long as a voltage can be applied to second liquid crystal layer 55.

Fourth electrode 58 is a transparent electrode having translucency. The material of fourth electrode 58 is, for example, indium tin oxide (ITO) or zinc oxide (ZnO).

Figure 5E:
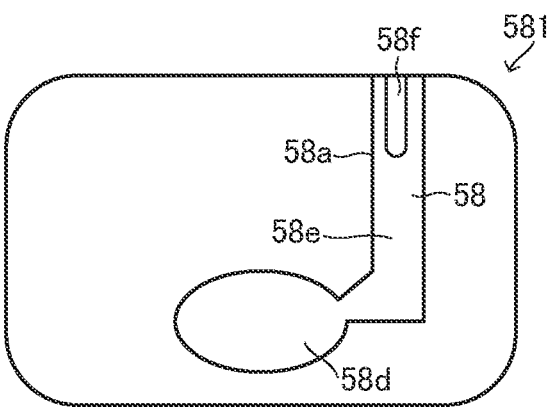
FIG. 5E is a schematic diagram of a fourth electrode.

In the case of the present embodiment, fourth electrode 58 is made up of part of transparent conductive film 581 provided all over the back surface of second substrate 33. Specifically, as shown in FIG. 5E, fourth electrode 58 is a portion surrounded by slit 58a formed in transparent conductive film 581.

Fourth electrode 58 is made up of voltage application portion 58d and connecting portion 58e. Voltage application portion 58d faces voltage application portion 41d of first electrode 41 and voltage application portion 48d of second electrode 48 in the thickness direction.

A first end of connecting portion 58e is exposed to the outside at fourth portion 24 of the outer peripheral surface of lens 2. Fourth portion 24 on the outer peripheral surface of lens 2 does not face first portion 21, second portion 22, or third portion 23 in the thickness direction. Fourth portion 24 is present in the upper half of the outer peripheral surface of lens 2. A second end of connecting portion 58e is connected to voltage application portion 58d.

Connecting portion 58e has thick portion 58f thicker than the other portion at the first end. Such thick portion 58f increases a contact area with a conductive member (not shown) provided in front 11. Above-described fourth electrode 58 is connected to power supplies 18 via the above-described conductive member and a power cable.

Second Substrate

Second substrate 33 is disposed at the frontmost side (far side from a user) in lens 2. Second substrate 33 is a transparent optical element having a pair of main surfaces (a front surface and a back surface). Second substrate 33 may have a disc shape that curves in a convex shape toward one side (front side) in the thickness direction.

The front surface and back surface of second substrate 33 each may be a convex curved surface that curves in a convex shape toward one side (front side) in the thickness direction. Second substrate 33 includes second diffraction structure 33c in a portion corresponding to first region 3 on the back surface.

As shown in FIG. 3, second diffraction structure 33c has spherical crown convex portion 331 at the center portion of the back surface. Convex portion 331 has a circular shape in front view. The central position of convex portion 331 coincides with the central position of second diffraction structure 33c (first region 3) in front view. Therefore, in front view, the central position of second diffraction structure 33c coincides with the central position of first diffraction structure 31c. In other words, in front view, the center of second diffraction structure 33c and the center of first diffraction structure 31c are positioned in the same axis parallel to the thickness direction.

Second diffraction structure 33c has a plurality of annular ridges 332 outside convex portion 331. Second diffraction structure 33c has a plurality of annular grooves each provided between any adjacent ridges 332. The configuration of second diffraction structure 33c is substantially similar to that of first diffraction structure 31c.

Second substrate 33 may have a coating layer (not shown) on its front surface. The coating layer provided on the front surface of second substrate 33 may be regarded as part of second substrate 33. Second diffraction structure 33c may be provided on the front surface of intermediate substrate 32 (described later).

Second Region

Second region 6 includes first substrate 31, first property fixed portion 60, intermediate substrate 32, second property fixed portion 70, second substrate 33, and the like, in order from the rear side. First substrate 31, intermediate substrate 32, and second substrate 33 are elements shared with first region 3. The elements of second region 6 have translucency for visible light. Second region 6 may also be regarded as being made up of portions other than first region 3 in lens 2. Second region 6 may have a predetermined optical power. The optical power of second region 6 is always constant.

First Property Fixed Portion

First property fixed portion 60 includes transparent conductive film 411, insulating film 42, adhesion layer 61, insulating film 47, transparent conductive film 481, and the like, in order from the rear side. Transparent conductive film 411, insulating film 42, insulating film 47, and transparent conductive film 481 are elements shared with first region 3.

Second Property Fixed Portion

Second property fixed portion 70 includes transparent conductive film 511, insulating film 53, adhesion layer 62, insulating film 57, transparent conductive film 581, and the like, in order from the rear side. Transparent conductive film 511, insulating film 53, insulating film 57, and transparent conductive film 581 are elements shared with first region 3.

Adhesion Layer

Adhesion layer 61 is transparent and provided between insulating film 42 and insulating film 47 in second region 6. Adhesion layer 61 may be regarded as being provided between first substrate 31 and intermediate substrate 32 in second region 6.

Adhesion layer 61 bonds insulating film 42 and insulating film 47. Adhesion layer 61 may be regarded as bonding first substrate 31 and second substrate 33. Such adhesion layer 61 also has a function to seal liquid crystal material that is a component of first liquid crystal layer 45.

Adhesion layer 62 is transparent and provided between insulating film 53 and insulating film 57 in second region 6. Adhesion layer 62 may be regarded as being provided between intermediate substrate 32 and second substrate 33 in second region 6.

Adhesion layer 62 bonds insulating film 53 and insulating film 57. Adhesion layer 62 may be regarded as bonding intermediate substrate 32 and second substrate 33. Such adhesion layer 62 also has a function to seal liquid crystal material that is a component of second liquid crystal layer 55.

Above-described adhesion layer 61 and adhesion layer 62 are, for example, optical pressure sensitive adhesive, thermoset adhesive, or ultraviolet cure adhesive. An example of the thermoset adhesive is an adhesive containing polyacrylate. Specifically, an example of the thermoset adhesive is LUCIACS (registered trademark) CS986 series manufactured by Nitto Denko Corporation. The material of the adhesive is not limited as long as the adhesive has desired translucency and is capable of appropriately bonding first substrate 31 and second substrate 33.

Front

As shown in FIG. 1, front 11 has a pair of rims 12 that support the pair of lenses 2, and bridge 13a that connects the pair of rims 12 in the width direction. The shape of each rim 12 is a shape corresponding to the shape of an associated one of lenses 2. Bridge 13a has a pair of nose pads 13b that can contact with the nose of a user.

As shown in FIG. 1, wires 19 for electrically connecting first electrode 41, second electrode 48, third electrode 51, and fourth electrode 58 of each lens 2 to control section 17 (described later) are provided inside front 11 (for example, a recessed groove formed on the inner peripheral surface).

First electrode 41, second electrode 48, third electrode 51, and fourth electrode 58 may be connected to conductive portions (not shown) of wires 19 by conductive members (not shown), such as conductive rubber.

The material of front 11 is not limited. The material of front 11 may be a known material that is used as the material of the front of glasses. The material of front 11 is, for example, polyamide, acetate, carbon, celluloid, polyetherimide, or urethane.

Temple

The pair of temples 14a, 14b is formed substantially bilaterally symmetric in electronic glasses G, and temples 14a, 14b have substantially the same component elements. Accordingly, in the following description, right-side (one side in the width direction) temple 14a will be described.

Temple 14a is connected to front 11 at its front end. For example, temple 14a may be pivotably engaged with rim 12 of front 11. As shown in FIG. 1, temple 14a includes casing 15 and detection section 16.

Casing 15 forms the outer shape of temple 14a. Casing 15 accommodates detection section 16 and control section 17. Casing 15 extends along one direction.

The material of casing 15 is not limited. The material of casing 15 may be a known material that is used as the material of the temple of glasses. The material of casing 15 may be the same as or different from, for example, the material of front 11.

Detection section 16 includes, for example, a capacitance-type detection pad. The detection pad may be a known detection pad that can be used as a touch sensor. Detection section 16 may detect a change in capacitance, which is caused by the contact of the finger of a user when the finger contacts with detection section 16.

First Example of Touch Operations

Detection section 16 detects, for example, information corresponding to a touch operation of a user to detection section 16. A first example of touch operations will be described. A first touch operation in a state where no voltage is applied to first property changeable portion 40 or second property changeable portion 50 (off state) indicates to apply a voltage to first property changeable portion 40. After the first touch operation, a voltage is applied to only first property changeable portion 40.

A second touch operation within a predetermined time from the first touch operation indicates to apply a voltage to second property changeable portion 50. After the second touch operation, a voltage is applied to first property changeable portion 40 and second property changeable portion 50.

A third touch operation in a state where a voltage is applied to first property changeable portion 40 and second property changeable portion 50 indicates to stop application of a voltage to first property changeable portion 40 and second property changeable portion 50.

Second Example of Touch Operations

A second example of touch operations will be described. A first touch operation in a state where no voltage is applied to first property changeable portion 40 or second property changeable portion 50 (off state) indicates to apply a voltage to only first property changeable portion 40. The property changeable portion to which a voltage is applied through the first touch operation is preferably a property changeable portion having a less optical power in a state where a voltage is applied.

A second touch operation within a predetermined time from the first touch operation indicates to apply a voltage to only second property changeable portion 50.

A third touch operation within a predetermined time from the second touch operation indicates to apply a voltage to first property changeable portion 40 and second property changeable portion 50.

A fourth touch operation in a state where a voltage is applied to first property changeable portion 40 and second property changeable portion 50 indicates to stop application of a voltage to first property changeable portion 40 and second property changeable portion 50.

Third Example of Touch Operations

A third example of touch operations will be described. In the case of a third example of touch operations, the property changeable portion to be controlled is changed according to the number of touch operations detected by detection section 16 within a predetermined time.

Specifically, when, for example, the number of touch operations detected by detection section 16 within the predetermined time (for example, one second) is a first number of times (for example, one), first property changeable portion 40 is switched between an on state and an off state. When the number of touch operations detected by detection section 16 within the predetermined time (for example, one second) is a second number of times (for example, two), second property changeable portion 50 is switched between an on state and an off state. The first number of times and the second number of times are different numbers. The first number of times and the second number of times may be set as needed.

Modification of Detection Section

An example of a modification of the detection section will be described. Electronic glasses G may include a plurality of the detection sections. The plurality of detection sections may be respectively associated with the plurality of property changeable portions.

For example, the plurality of detection sections may include a first detection section that detects a touch operation for operating first property changeable portion 40 and a second detection section that detects a touch operation for operating second property changeable portion 50.

In the case of the above-described configuration, a user switches first property changeable portion 40 between the on state and the off state by performing a touch operation to the first detection section. The user switches second property changeable portion 50 between the on state and the off state by performing a touch operation to the second detection section.

Control Section

Control section 17 is electrically connected to the detection pad of detection section 16, first electrode 41, second electrode 48, third electrode 51, and fourth electrode 58 via wires 19.

When detection section 16 detects the contact of an object, control section 17 changes the optical power of first region 3 by applying a voltage to the pair of lenses 2 or stopping application of a voltage to the pair of lenses 2 (see FIG. 2).

Control section 17 includes, for example, a control circuit (not shown) that controls application of a voltage to at least one of first property changeable portion 40 (specifically, first electrode 41 and second electrode 48) of each lens 2 and second property changeable portion 50 (specifically, third electrode 51 and fourth electrode 58) of each lens 2 based on detection information of detection section 16.

Specifically, when detection information of detection section 16 is information indicating to stop application of a voltage to first property changeable portion 40 and second property changeable portion 50, control section 17 stops application of a voltage to first property changeable portion 40 and second property changeable portion 50.

When detection information of detection section 16 is information indicating to apply a voltage to only first property changeable portion 40, control section 17 applies a voltage to only first property changeable portion 40.

When detection information of detection section 16 is information indicating to apply a voltage to only second property changeable portion 50, control section 17 applies a voltage to only second property changeable portion 50.

When detection information of detection section 16 is information indicating to apply a voltage to first property changeable portion 40 and second property changeable portion 50, control section 17 applies a voltage to first property changeable portion 40 and second property changeable portion 50.

Power Supply

Power supplies 18 supply electric power to detection section 16 and control section 17 (see FIG. 2). In the present embodiment, power supplies 18 are rechargeable battery packs detachably held at the other ends (rear ends) of temples 14a, 14b. Each power supply 18 may be, for example, a nickel-metal hydride rechargeable battery.

Operation of Electronic Glasses

Next, an example of the operation of electronic glasses G will be described. Initially, the state where no voltage is applied to first property changeable portion 40 or second property changeable portion 50 of electronic glasses G (off state) will be described.

In the off state, the refractive indices of first liquid crystal layer 45 and second liquid crystal layer 55 are substantially equal to the refractive indices of first substrate 31 and second substrate 33 in first region 3 of lens 2. Therefore, no lens effect caused by first liquid crystal layer 45 or second liquid crystal layer 55 occurs in first property changeable portion 40 or second property changeable portion 50.

When a conductive object (for example, the finger of a user) contacts with detection section 16, a change in capacitance based on the contact is detected by the detection pad of detection section 16. Detection information based on the contact is transmitted to control section 17. Control section 17 applies a voltage to at least one of first property changeable portion 40 and second property changeable portion 50 based on the acquired detection information of detection section 16 in the off state.

Thus, alignment of the liquid crystal material in the at least one of first property changeable portion 40 and second property changeable portion 50, applied with a voltage, changes, and the optical power (refractive index) of the liquid crystal layer changes (on state).

In the on state, the refractive index of the liquid crystal layer in the property changeable portion applied with a voltage is different from the refractive indices of first substrate 31 and second substrate 33. Therefore, a lens effect caused by the liquid crystal layer of the property changeable portion applied with a voltage occurs in first region 3. As a result, the optical power of first region 3 changes.

First region 3 in the on state is capable of realizing three different optical powers. A first optical power is an optical power in a state where a voltage is applied to only first property changeable portion 40. The first optical power is the sum of the optical power of first region 3 in the off state and the optical power of first property changeable portion 40 in the on state.

A second optical power is an optical power in a state where a voltage is applied to only second property changeable portion 50. The second optical power is the sum of the optical power of first region 3 in the off state and the optical power of second property changeable portion 50 in the on state.

A third optical power is an optical power in a state where a voltage is applied to first property changeable portion 40 and second property changeable portion 50. The third optical power is the sum of the optical power of first region 3 in the off state, the optical power of first property changeable portion 40 in the on state, and the optical power of second property changeable portion 50 in the on state. The first optical power, the second optical power, and the third optical power may be set as needed according to usage of lens 2.

In the on state, when detection section 16 detects information indicating to stop application of a voltage to first property changeable portion 40 and second property changeable portion 50, control section 17 stops application of a voltage to first property changeable portion 40 and second property changeable portion 50. Thus, alignment of the liquid crystal material in first liquid crystal layer 45 and second liquid crystal layer 55 returns to the state before voltage application, and the refractive indices of first property changeable portion 40 and second property changeable portion 50 become the refractive indices in the off state.

As described above, electronic glasses G according to the present embodiment is capable of changing the optical power of first region 3 of each lens 2 by detecting the contact of an object.

Modification 1 of Embodiment 1

Figure 6A:
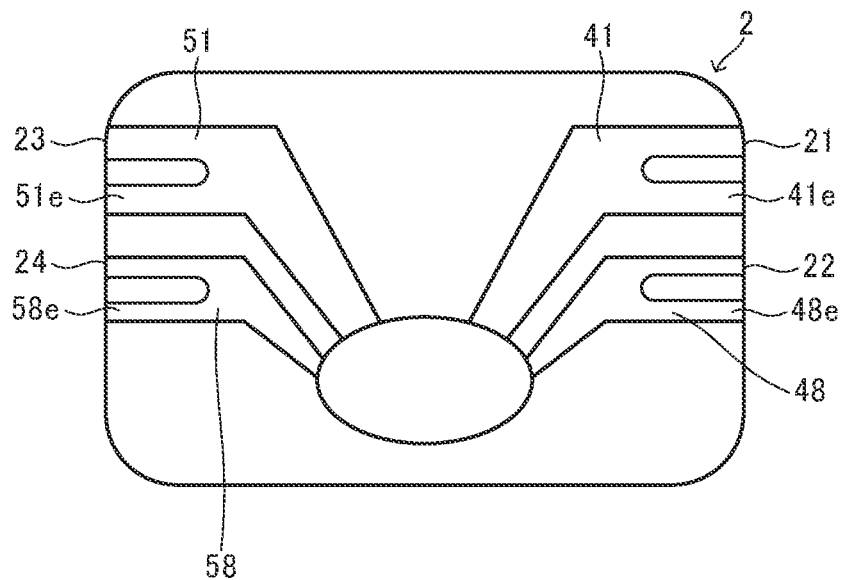
FIG. 6A is a front schematic diagram of a lens according to Modification 1 of Embodiment 1.

Modification 1 of Embodiment 1 will be described with reference to FIG. 6A. Positions at which first electrode 41, second electrode 48, third electrode 51, and fourth electrode 58 are exposed to the outside (first portion 21, second portion 22, third portion 23, and fourth portion 24) may be positions shown in FIG. 6A.

Specifically, in the case of the present modification, first portion 21 is present in one-side half in the width direction of the outer peripheral surface of lens 2. The one-side half in the width direction may be a half closer to an associated one of the pair of temples 14a, 14b in a state where lens 2 is held by frame 1. Alternatively, the one-side half in the width direction may be a half closer to bridge 13a in a state where lens 2 is held by frame 1.

Second portion 22 is present in the one-side half in the width direction of the outer peripheral surface of lens 2. Third portion 23 is present in the other-side half in the width direction of the outer peripheral surface of lens 2. Fourth portion 24 is present in the other-side half in the width direction of the outer peripheral surface of lens 2.

First portion 21, second portion 22, third portion 23, and fourth portion 24 do not face each other in the thickness direction.

The above-described present modification is applicable to a frame with no rim on the upper side and lower side of each lens 2. Such a configuration contributes to increasing variations of frame design.

Modification 2 of Embodiment 1

Figure 6B:
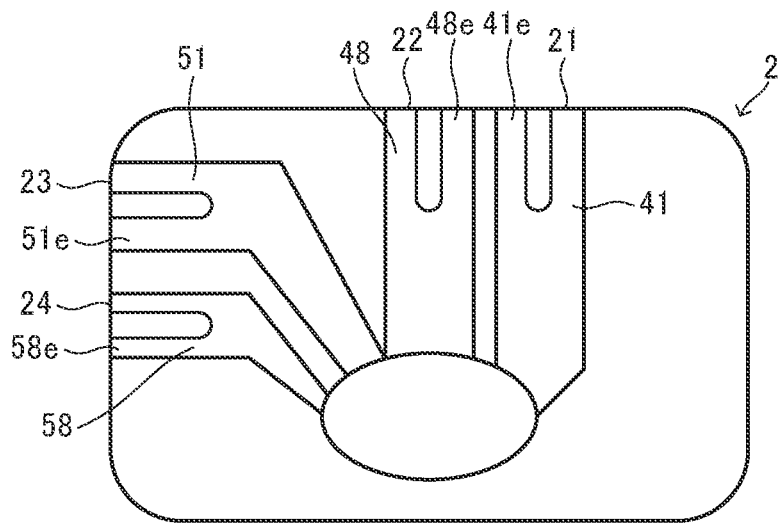
FIG. 6B is a front schematic diagram of a lens according to Modification 2 of Embodiment 1.

Modification 2 of Embodiment 1 will be described with reference to FIG. 6B. In the case of the present modification, first portion 21 and second portion 22 are present in the upper half of the outer peripheral surface of lens 2.

Third portion 23 and fourth portion 24 are present in one-side half in the width direction of the outer peripheral surface of lens 2. First portion 21, second portion 22, third portion 23, and fourth portion 24 do not face each other in the thickness direction.

The above-described present modification is applicable to a frame with no rim on the lower side of each lens 2. Such a configuration contributes to increasing variations of frame design.

Modification 3 of Embodiment 1

Figure 6C:
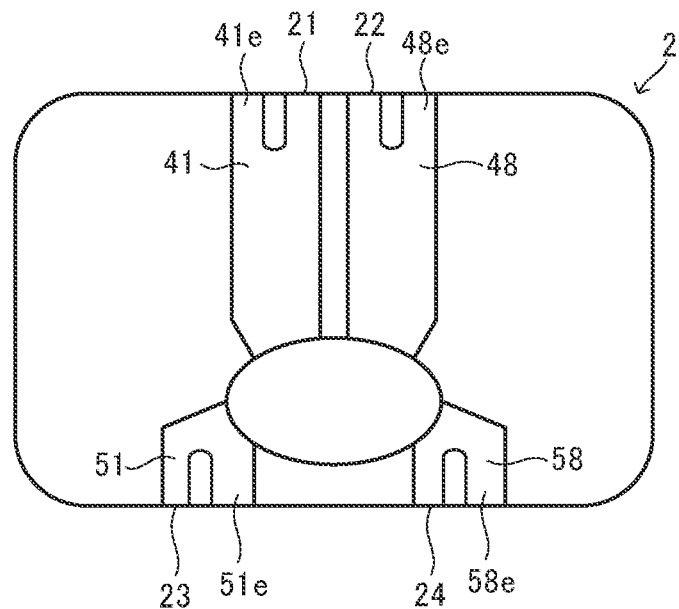
FIG. 6C is a front schematic diagram of a lens according to Modification 3 of Embodiment 1.

Modification 3 of Embodiment 1 will be described with reference to FIG. 6C. In the case of the present modification, first portion 21 and second portion 22 are present in the upper half of the outer peripheral surface of lens 2.

Third portion 23 and fourth portion 24 are present in the lower half of the outer peripheral surface of lens 2. First portion 21, second portion 22, third portion 23, and fourth portion 24 do not face each other in the thickness direction.

In the case of the above-described present modification, portions at which the electrodes are exposed can be distributed to the lower side and upper side of lens 2.

Modification 4 of Embodiment 1

Figure 6D:
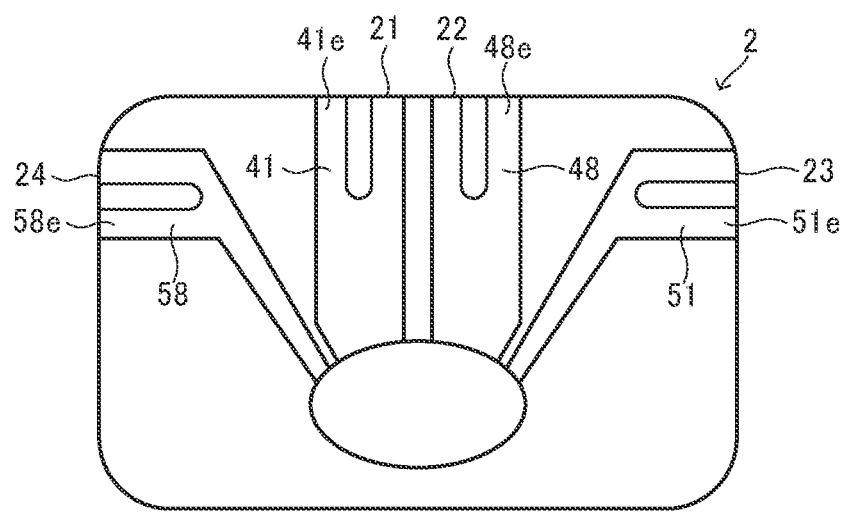
FIG. 6D is a front schematic diagram of a lens according to Modification 4 of Embodiment 1.

Modification 4 of Embodiment 1 will be described with reference to FIG. 6D. In the case of the present modification, first portion 21 and second portion 22 are present in the upper half of the outer peripheral surface of lens 2.

Third portion 23 is present in one-side half in the width direction of the outer peripheral surface of lens 2. Fourth portion 24 is present in the other-side half in the width direction of the outer peripheral surface of lens 2. First portion 21, second portion 22, third portion 23, and fourth portion 24 do not face each other in the thickness direction.

The above-described present modification is applicable to a frame with no rim on the lower side of each lens 2. Such a configuration contributes to increasing variations of frame design. In addition, portions at which the electrodes are exposed can be distributed to the upper side and both ends in the width direction of lens 2.

Modification 5 of Embodiment 1

Intermediate substrate 32 may be omitted from lens 2 shown in FIG. 4, and second electrode 48 and third electrode 51 may be made up of a single electrode, which is not shown in the drawing. In other words, first property changeable portion 40 and second property changeable portion 50 may share a single electrode.

Operation and Advantageous Effects

With above-described lens 2 and electronic glasses G according to the present embodiment, first property changeable portion 40 and second property changeable portion 50 are provided so as to face in the thickness direction, so it is possible to individually set the optical power of first property changeable portion 40 in the on state and the optical power of second property changeable portion 50 in the on state. As a result, it is possible to increase the pattern of the optical power of first region 3 in the on state.

A user of electronic glasses G into which lenses 2 according to the present embodiment are incorporated is able to select the optical power of first region 3 in a stepwise manner through a touch operation to detection section 16.

Embodiment 2

Figure 7:
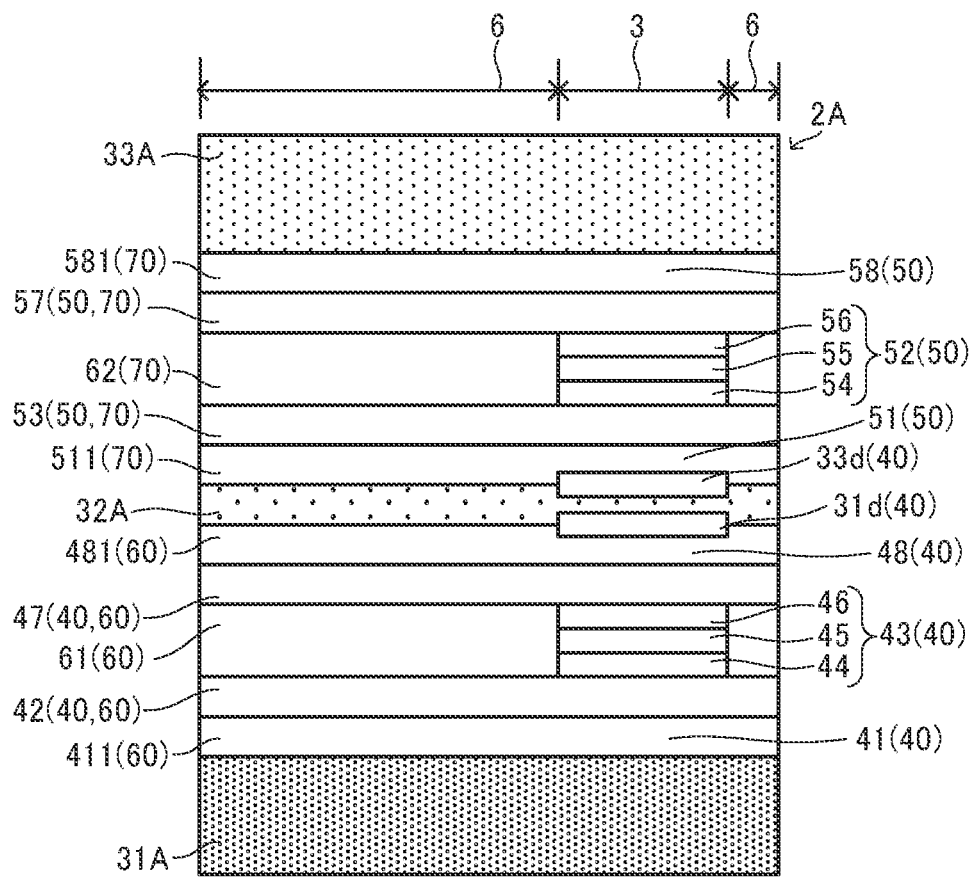
FIG. 7 is a schematic diagram showing an example of the layer structure of a lens according to Embodiment 2.

Lens 2A according to Embodiment 2 of the present invention will be described with reference to FIG. 7. FIG. 7 is a schematic diagram showing the layer structure of lens 2A.

In the case of lens 2A, the positions of first diffraction structure 31c and second diffraction structure 33c are different from those of lens 2 of the above-described Embodiment 1.

Specifically, in the case of lens 2A, first substrate 31A has no first diffraction structure 31c. In addition, second substrate 33A has no second diffraction structure 33c.

In the case of lens 2A, first diffraction structure 31d is provided on the back surface of intermediate substrate 32A. Specifically, first diffraction structure 31d is provided in a region corresponding to first region 3 on the back surface of intermediate substrate 32A. A specific configuration of first diffraction structure 31d is similar to that of lens 2 of the above-described Embodiment 1.

In the case of lens 2A, second diffraction structure 33d is provided on the front surface of intermediate substrate 32A. Specifically, second diffraction structure 33d is provided in a region corresponding to first region 3 on the front surface of intermediate substrate 32A. A specific configuration of second diffraction structure 33d is similar to that of lens 2 of the above-described Embodiment 1. The configuration of the present embodiment may be applied to the structures of the above-described Modification 1 to Modification 4. The other configuration, operation, and advantageous effects are similar to those of the above-described Embodiment 1.

Embodiment 3

Figure 8A:
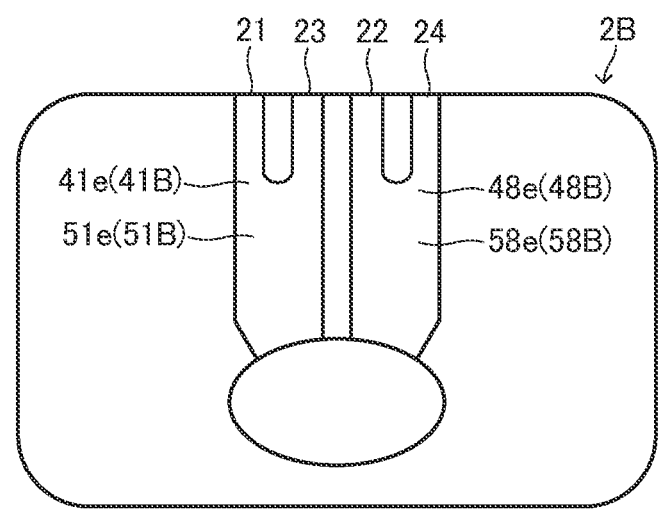
FIG. 8A is a front schematic diagram of a lens according to Embodiment 3.
Figure 8B:
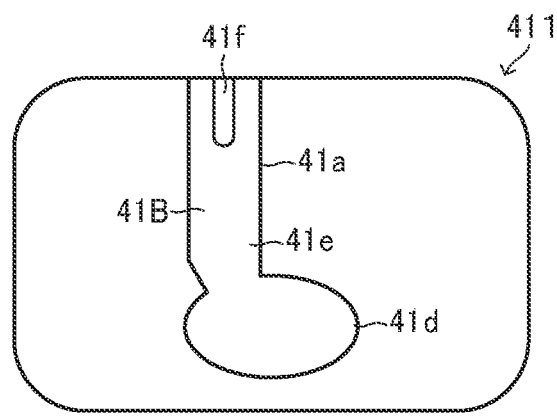
FIG. 8B is a schematic diagram of a first electrode.
Figure 8C:
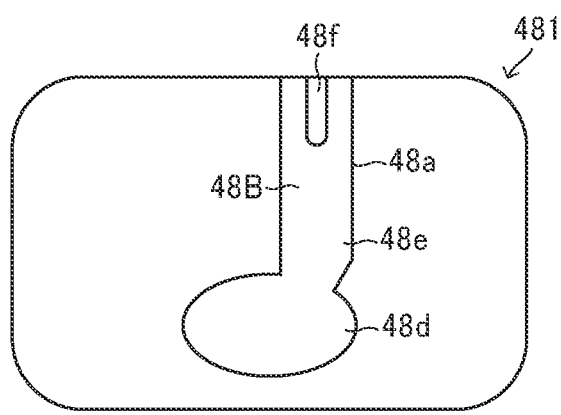
FIG. 8C is a schematic diagram of a second electrode.
Figure 8D:
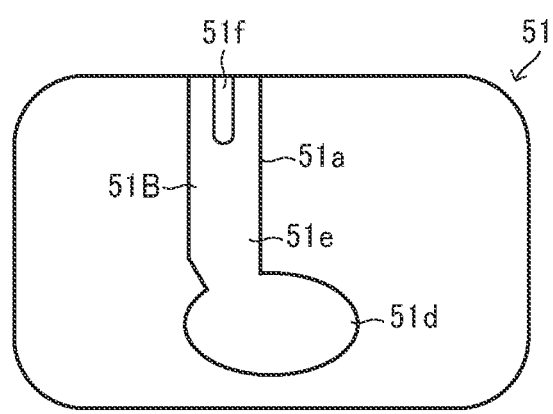
FIG. 8D is a schematic diagram of a third electrode.
Figure 8E:
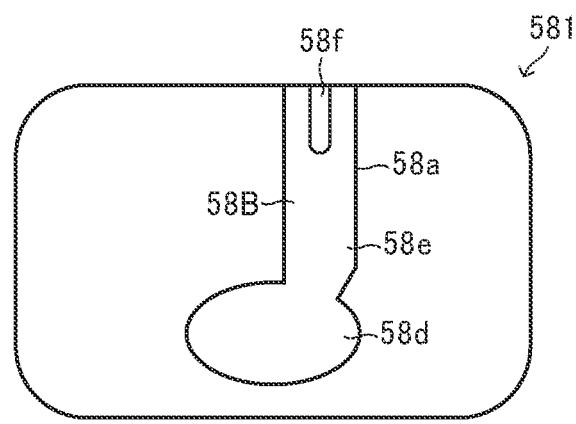
FIG. 8E is a schematic diagram of a fourth electrode.

Lens 2B according to Embodiment 3 of the present invention will be described with reference to FIGS. 8A to 8E. FIG. 8A is a front schematic diagram of lens 2B.

Lens 2B has a layer structure similar to that of lens 2 shown in FIGS. 3 and 4 or that of lens 2A shown in FIG. 7. Lens 2B differs from lens 2 shown in FIGS. 3 and 4 and lens 2A shown in FIG. 7 in the structures of first electrode 41B, second electrode 48B, third electrode 51B, and fourth electrode 58B.

In the case of the present modification, first electrode 41B and third electrode 51B have the same structure. Specifically, first electrode 41B and third electrode 51B face in the thickness direction. First electrode 41B and third electrode 51B are exposed to the outside on the outer peripheral surface of lens 2B at positions facing in the thickness direction.

Specifically, first electrode 41B is exposed to the outside at first portion 21 on the outer peripheral surface of lens 2B. First portion 21 is present in the upper half of the outer peripheral surface of lens 2B.

Third electrode 51B is exposed to the outside at third portion 23 on the outer peripheral surface of lens 2B. Third portion 23 faces first portion 21 in the thickness direction.

Second electrode 48B and fourth electrode 58B have the same structure. Specifically, second electrode 48B and fourth electrode 58B face in the thickness direction. Second electrode 48B and fourth electrode 58B are exposed to the outside on the outer peripheral surface of lens 2B at positions facing in the thickness direction.

Specifically, second electrode 48B is exposed to the outside at second portion 22 on the outer peripheral surface of lens 2B. Second portion 22 is present in the upper half of the outer peripheral surface of lens 2B. Second portion 22 does not face first portion 21 in the thickness direction.

Fourth electrode 58B is exposed to the outside at fourth portion 24 on the outer peripheral surface of lens 2B. Fourth portion 24 faces second portion 22 in the thickness direction.

In the case of the present embodiment having the above-described configuration, first electrode 41B and third electrode 51B are exposed to the outside at portions facing in the thickness direction in lens 2B. Therefore, first electrode 41B and third electrode 51B are applied with a voltage at the same time.

Second electrode 48B and fourth electrode 58B are exposed to the outside at portions facing in the thickness direction in lens 2B. Therefore, second electrode 48B and fourth electrode 58B are applied with a voltage at the same time. Therefore, the present embodiment is applicable to a configuration in which first property changeable portion 40 and second property changeable portion 50 are controlled at the same time.

First electrode 41B and third electrode 51B face in the thickness direction and second electrode 48B and fourth electrode 58B face in the thickness direction, so the number of electrodes visually recognized in front view of lens 2B is reduced. The other configuration, operation, and advantageous effects are similar to those of the above-described Embodiment 1 and Embodiment 2.

As a modification of the present embodiment, first electrode 41B, second electrode 48B, third electrode 51B, and fourth electrode 58B may face in the thickness direction. In the case of this configuration, the number of electrodes visually recognized in front view of lens 2B is further reduced.

Embodiment 4

Figure 9A:
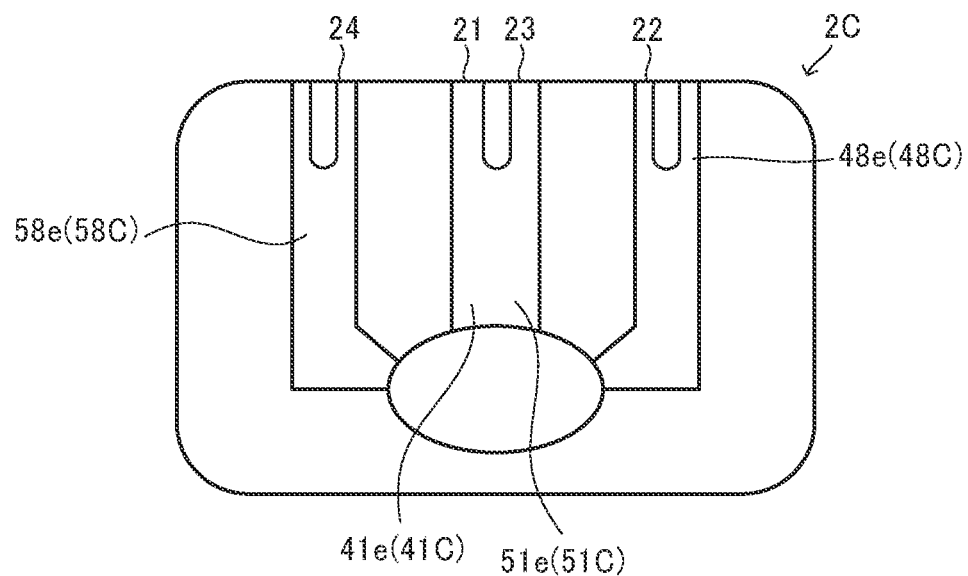
FIG. 9A is a front schematic diagram of a lens according to Embodiment 4.
Figure 9B:
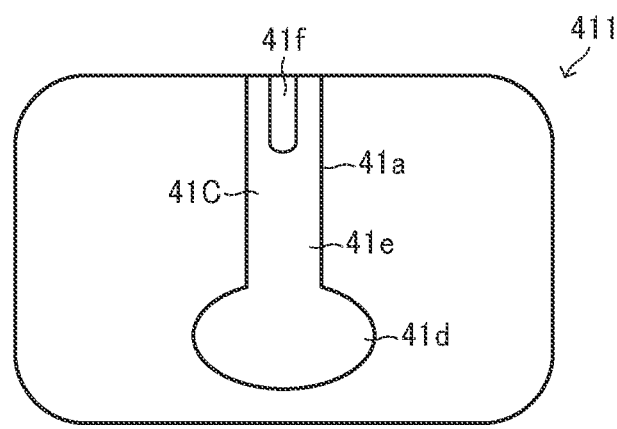
FIG. 9B is a schematic diagram of a first electrode.
Figure 9C:
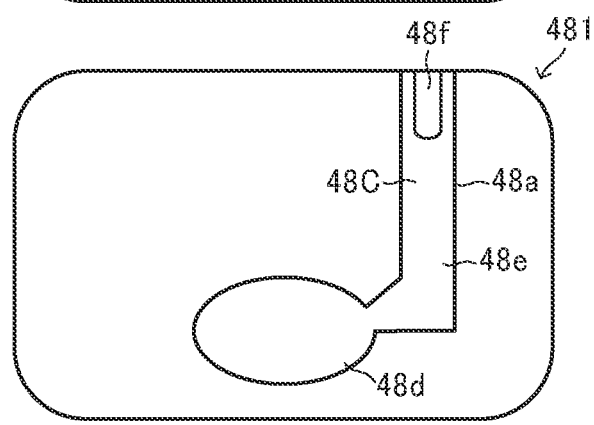
FIG. 9C is a schematic diagram of a second electrode.
Figure 9D:
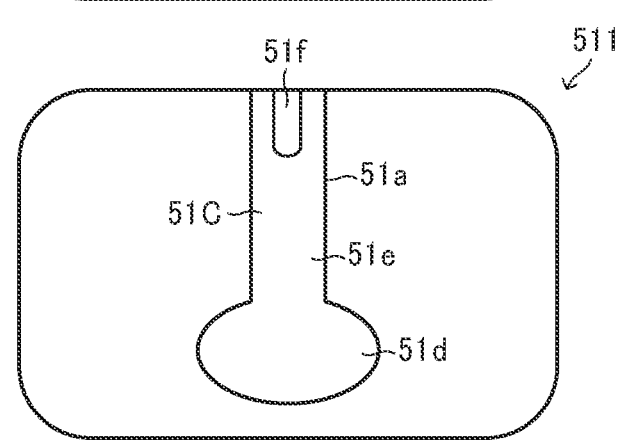
FIG. 9D is a schematic diagram of a third electrode.
Figure 9E:
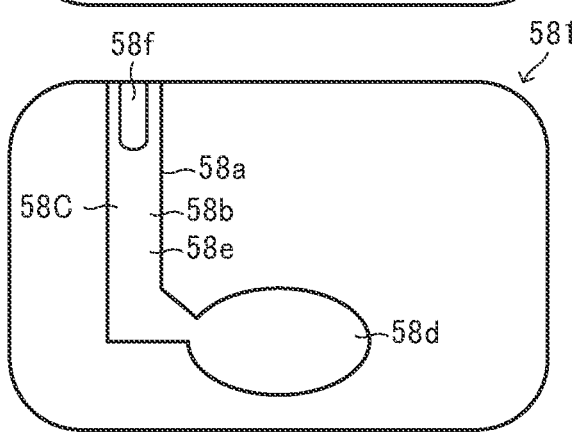
FIG. 9E is a schematic diagram of a fourth electrode.

Lens 2C according to Embodiment 4 will be described with reference to FIGS. 9A to 9D. FIG. 9A is a front schematic diagram of lens 2C.

Lens 2C has a layer structure similar to that of lens 2 shown in FIGS. 3 and 4 or that of lens 2A shown in FIG. 7. Lens 2C differs from lens 2 shown in FIGS. 3 and 4 and lens 2A shown in FIG. 7 in the structures of first electrode 41C, second electrode 48C, third electrode 51C, and fourth electrode 58C.

In the case of the present embodiment, first electrode 41C and third electrode 51C have the same structure. Specifically, first electrode 41C and third electrode 51C face in the thickness direction. First electrode 41C and third electrode 51C are exposed to the outside at positions facing in the thickness direction on the outer peripheral surface of lens 2C.

Specifically, first electrode 41C is exposed to the outside at first portion 21 on the outer peripheral surface of lens 2C. First portion 21 is present in the upper half of the outer peripheral surface of lens 2C.

Third electrode 51C is exposed to the outside at third portion 23 on the outer peripheral surface of lens 2C. Third portion 23 faces first portion 21 in the thickness direction.

Second electrode 48C and fourth electrode 58C have different structures. Second electrode 48C is exposed to the outside at second portion 22 on the outer peripheral surface of lens 2C. Second portion 22 does not face first portion 21 in the thickness direction. Second portion 22 is present in the upper half of the outer peripheral surface of lens 2C.

Fourth electrode 58C is exposed to the outside at fourth portion 24 on the outer peripheral surface of lens 2C. Fourth portion 24 does not face first portion 21, second portion 22, or third portion 23 in the thickness direction. Fourth portion 24 is present in the upper half on the outer peripheral surface of lens 2C.

In the case of the thus configured present embodiment, first electrode 41C and third electrode 51C face in the thickness direction, so the number of electrodes visually recognized in front view of lens 2C is reduced from that of the above-described Embodiment 1. In addition, portions where the electrodes are exposed are concentrated to the upper side of lens 2C, so lens 2C is applicable to a frame with no rim on the lower side and both ends in the width direction of lens 2C. Such a configuration contributes to increasing variations of frame design.

Modification 1 of Embodiment 4

Modification 1 of Embodiment 4 will be described with reference to FIG. 10A. In the case of the present modification, first electrode 41C and third electrode 51C have the same structure.

Figure 10A:
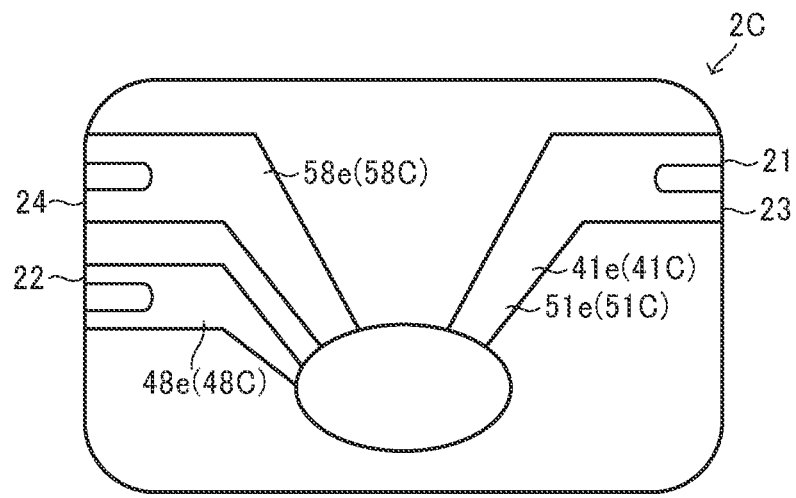
FIG. 10A is a front schematic diagram of a lens according to Modification 1 of Embodiment 4.

Positions at which first electrode 41C, second electrode 48C, third electrode 51C, and fourth electrode 58C are exposed to the outside (first portion 21, second portion 22, third portion 23, and fourth portion 24) may be positions shown in FIG. 10A.

Specifically, first portion 21 is present in one-side half in the width direction of the outer peripheral surface of lens 2C. Second portion 22 is present in the other-side half in the width direction of the outer peripheral surface of lens 2C.

Third portion 23 is present in the one-side half in the width direction of the outer peripheral surface of lens 2C. Third portion 23 faces first portion 21 in the thickness direction.

Fourth portion 24 is present in the other-side half in the width direction of the outer peripheral surface of lens 2C. Fourth portion 24 does not face first portion 21, second portion 22, or third portion 23 in the thickness direction.

In the case of the thus configured present modification, first electrode 41C and third electrode 51C face in the thickness direction, so the number of electrodes visually recognized in front view of lens 2C is reduced from that of the above-described Embodiment 1. In addition, portions where the electrodes are exposed are distributed to both ends of lens 2C in the width direction, so lens 2C is applicable to a frame with no rim on the upper and lower sides of lens 2C. Such a configuration contributes to increasing variations of frame design.

Modification 2 of Embodiment 4

Figure 10B:
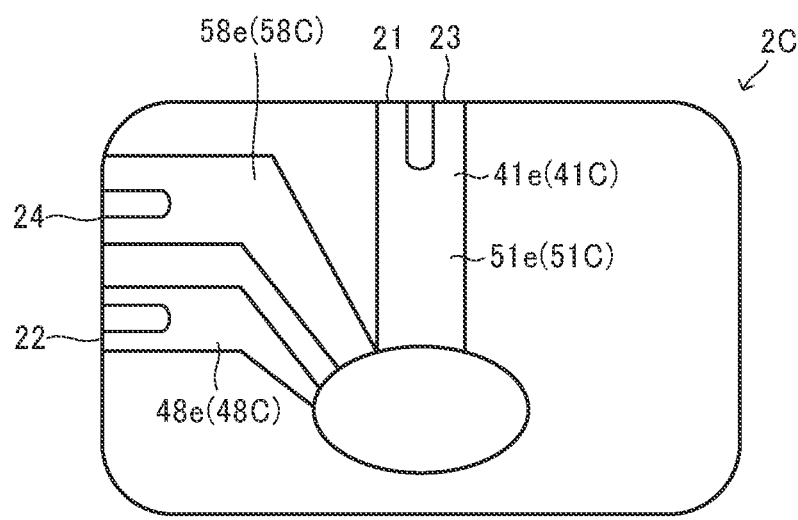
FIG. 10B is a front schematic diagram of a lens according to Modification 2 of Embodiment 4.

Modification 2 of Embodiment 4 will be described with reference to FIG. 10B. In the case of the present modification, first portion 21 is present in the upper half of the outer peripheral surface of lens 2C.

Second portion 22 is present in one-side half in the width direction of the outer peripheral surface of lens 2C. Second portion 22 does not face first portion 21 in the thickness direction.

Third portion 23 is present in the upper half of the outer peripheral surface of lens 2C. Third portion 23 faces first portion 21 in the thickness direction.

Fourth portion 24 is present in the one-side half in the width direction of the outer peripheral surface of lens 2C. Fourth portion 24 does not face first portion 21, second portion 22, or third portion 23 in the thickness direction.

In the case of the thus configured present modification, first electrode 41C and third electrode 51C face in the thickness direction, so the number of electrodes visually recognized in front view of lens 2C is reduced from that of the above-described Embodiment 1. In addition, portions where the electrodes are exposed are distributed to the upper half and one-side half in the width direction of lens 2C, so lens 2C is applicable to a frame with no rim on the lower side of lens 2C. Such a configuration contributes to increasing variations of frame design.

Modification 3 of Embodiment 4

Figure 10C:
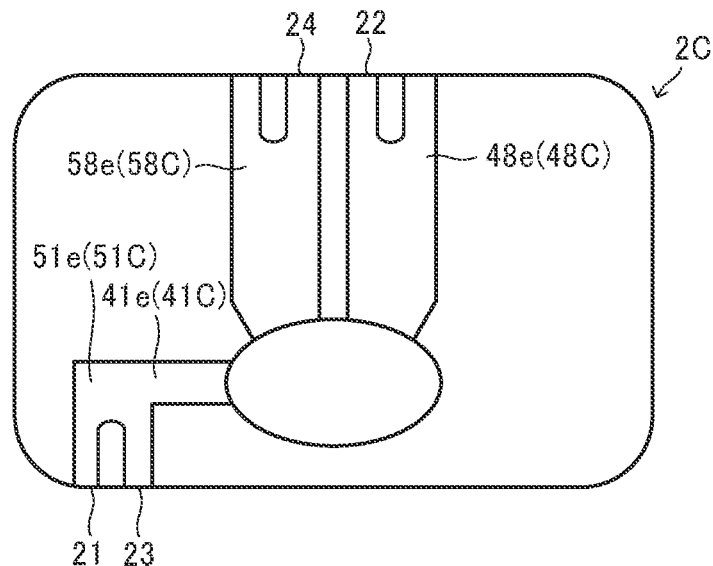
FIG. 10C is a front schematic diagram of a lens according to Modification 3 of Embodiment 4.

Modification 3 of Embodiment 4 will be described with reference to FIG. 10C. In the case of the present modification, first portion 21 is present in the lower half of the outer peripheral surface of lens 2C.

Second portion 22 is present in the upper half of the outer peripheral surface of lens 2C. Second portion 22 does not face first portion 21 in the thickness direction.

Third portion 23 is present in the lower half of the outer peripheral surface of lens 2C. Third portion 23 faces first portion 21 in the thickness direction.

Fourth portion 24 does not face first portion 21, second portion 22, or third portion 23 in the thickness direction. Fourth portion 24 is present in the upper half of the outer peripheral surface of lens 2C.

In the case of the thus configured present modification, first electrode 41C and third electrode 51C face in the thickness direction, so the number of electrodes visually recognized in front view of lens 2C is reduced from that of the above-described Embodiment 1.

Modification 4 of Embodiment 4

Figure 10D:
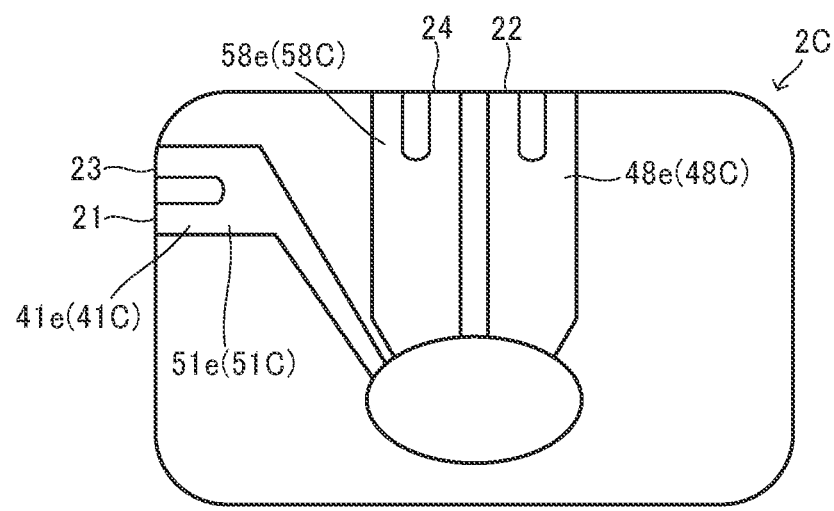
FIG. 10D is a front schematic diagram of a lens according to Modification 4 of Embodiment 4.

Modification 4 of Embodiment 4 will be described with reference to FIG. 10D. In the case of the present modification, first portion 21 is present in one-side half in the width direction of the outer peripheral surface of lens 2C.

Second portion 22 is present in the upper half of the outer peripheral surface of lens 2C. Second portion 22 does not face first portion 21 in the thickness direction.

Third portion 23 is present in the one-side half in the width direction of the outer peripheral surface of lens 2C. Third portion 23 faces first portion 21 in the thickness direction.

Fourth portion 24 is present in the upper half of the outer peripheral surface of lens 2C. Fourth portion 24 does not face first portion 21, second portion 22, or third portion 23 in the thickness direction.

Embodiment 5

Figure 11:
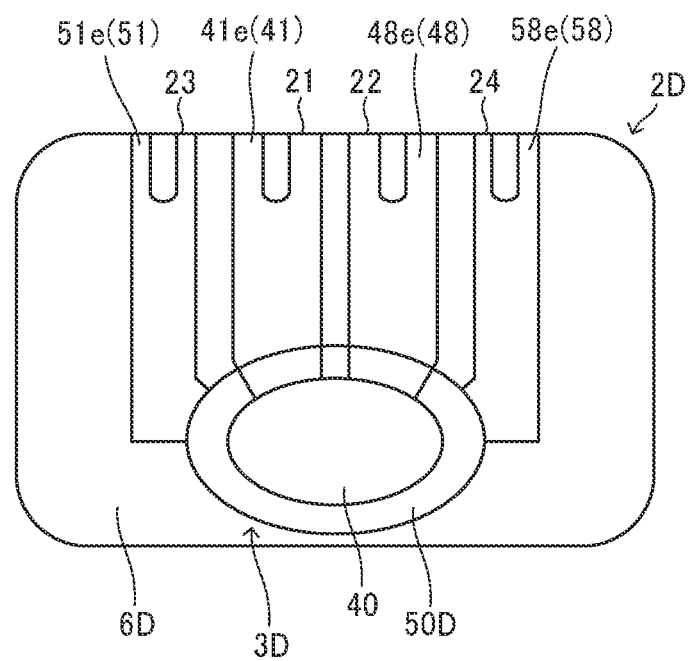
FIG. 11 is a front schematic diagram of a lens according to Embodiment 5.

Lens 2D according to Embodiment 5 will be described with reference to FIG. 11. Lens 2D has a layer structure similar to that of lens 2 shown in FIGS. 3 and 4.

Lens 2D differs from lens 2 shown in FIGS. 3 and 4 in the size of second property changeable portion 50D. Specifically, second property changeable portion 50D is greater than first property changeable portion 40 in front view. The other configuration is similar to that of the above-described Embodiment 1.

Hereinafter, the optical power of first region 3D in lens 2D of the present embodiment will be described. First region 3D is a region that faces second property changeable portion 50D in front view.

Hereinafter, a state where a voltage is applied to first property changeable portion 40 is referred to as the on state of first property changeable portion 40. A state where no voltage is applied to first property changeable portion 40 is referred to as the off state of first property changeable portion 40.

A state where a voltage is applied to second property changeable portion 50D is referred to as the on state of second property changeable portion 50D. A state where no voltage is applied to second property changeable portion 50D is referred to as the off state of second property changeable portion 50D.

Initially, the optical power of first region 3D in the off state of first property changeable portion 40 and the off state of second property changeable portion 50D is equal to the optical power of second region 6D.

When only first property changeable portion 40 is in the on state, the optical power of a portion corresponding to first property changeable portion 40 in first region 3D is the sum of the optical power of first region 3D in the off state and the optical power of first property changeable portion 40 in the on state.

When only second property changeable portion 50D is in the on state, the optical power of a portion corresponding to second property changeable portion 50D in first region 3D is the sum of the optical power of first region 3D in the off state and the optical power of second property changeable portion 50D in the on state.

When first property changeable portion 40 and second property changeable portion 50D are in the on state, first region 3D has two different optical powers. A first optical power is the optical power of a portion that does not face first property changeable portion 40 but faces second property changeable portion 50D in first region 3D. The first optical power is the sum of the optical power of first region 3D in the off state and the optical power of second property changeable portion 50D in the on state.

A second optical power is the optical power of a portion that faces first property changeable portion 40 and second property changeable portion 50D in first region 3D. The second optical power is the sum of the optical power of first region 3D in the off state, the optical power of first property changeable portion 40 in the on state, and the optical power of second property changeable portion 50D in the on state.

According to the thus configured present embodiment, first region 3D has two property changeable portions with different viewing angles, so it is possible to further flexibly set the viewing angle and the optical power. The other configuration, operation, and advantageous effects are similar to those of the above-described Embodiment 1.

Reference Example 1

Lens 2T according to Reference Example 1 will be described with reference to FIGS. 12 to 14B. Lens 2T has a layer structure different from that of lens 2 shown in FIGS. 3 and 4.

Lens 2T includes first region 3T capable of changing its optical power by voltage, second region 5T capable of changing its optical power by voltage, and third region 6T disposed in a region other than first region 3T or second region 5T. Lens 2T may be a spherical lens or may be an aspherical lens.

First Region

Figure 13:
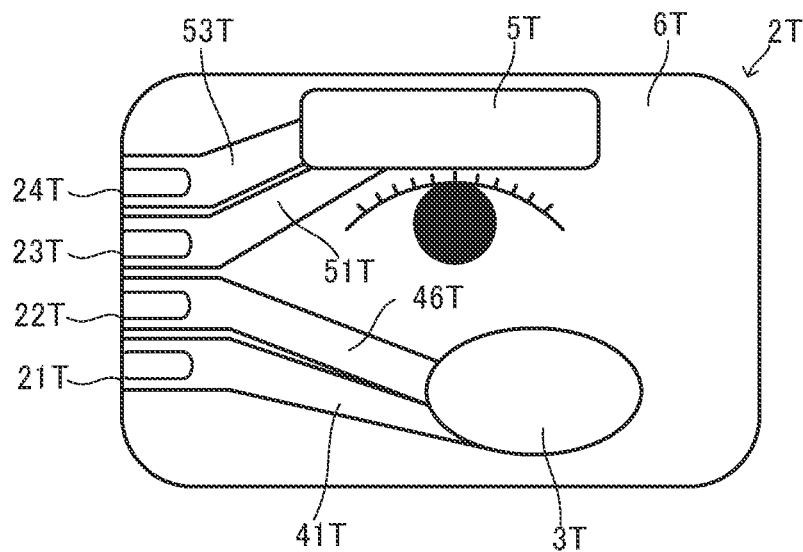
FIG. 13 is a front schematic diagram of the lens.

As shown in FIG. 13, first region 3T is disposed below the eye of a user in a worn state where the user is wearing electronic glasses (hereinafter, simply referred to as "worn state"). Such first region 3T may have an optical power that makes it easy to see an object at a short distance in a state where a voltage is applied to first property changeable portion 40T.

Figure 12:
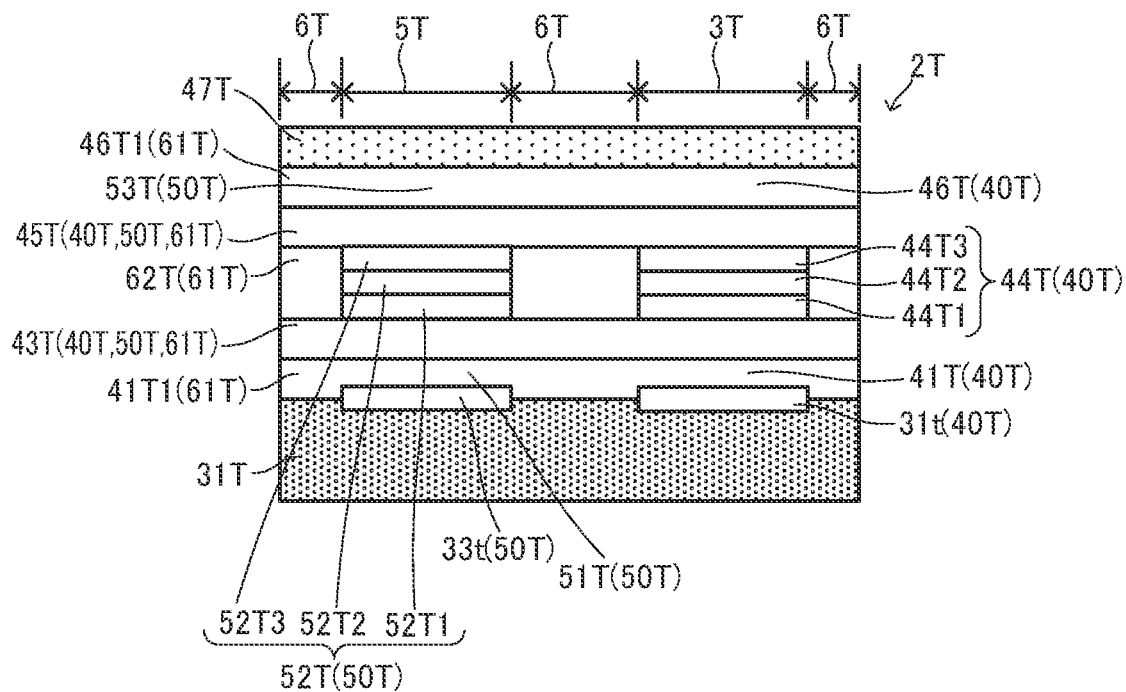
FIG. 12 is a schematic diagram showing an example of the layer structure of a lens according to Reference Example 1.

As shown in FIG. 12, first region 3T includes first substrate 31T, first property changeable portion 40T, second substrate 47T, and the like, in order from the rear side (lower side in FIG. 12). The elements of first region 3T have translucency for visible light.

First region 3T has substantially the same optical power as the optical power of third region 6T in the voltage non-application state where no voltage is applied to first property changeable portion 40T.

On the other hand, first region 3T has an optical power different from the optical power of third region 6T in the voltage application state where a voltage is applied to first property changeable portion 40T.

First Substrate

First substrate 31T includes first diffraction structure 31t at a portion corresponding to first region 3T on the front surface. First substrate 31T includes second diffraction structure 33t at a portion corresponding to second region 5T on the front surface. First diffraction structure 31t and second diffraction structure 33t are substantially similar to first diffraction structure 31c of the above-described Embodiment 1, so the detailed description is omitted.

In the case of the present embodiment, the pitch (hereinafter, referred to as "first pitch") of ridges (see ridges 312 in FIG. 3) of first diffraction structure 31t is different from the pitch (hereinafter, referred to as "second pitch") of ridges (see ridges 312 in FIG. 3) of second diffraction structure 33t. The first pitch may be less or may be greater than the second pitch.

When the first pitch is less than the second pitch, the optical power of first region 3T is greater than the optical power of second region 5T in the voltage application state of first property changeable portion 40T. On the other hand, when the first pitch is greater than the second pitch, the optical power of first region 3T in the voltage application state of first property changeable portion 40T is less than the optical power of second region 5T in the voltage application state of second property changeable portion 50T.

The other configuration of first substrate 31T is substantially similar to that of first substrate 31 of the above-described Embodiment 1. Therefore, the description of first substrate 31 of Embodiment 1 may be read as the description of the configuration of first substrate 31T as needed.

First Property Changeable Portion

First property changeable portion 40T includes above-described first diffraction structure 31t, first electrode 41T, insulating film 43T, first liquid crystal module 44T, insulating film 45T, second electrode 46T, and the like, in order from the rear side.

First Electrode

Figure 14A:
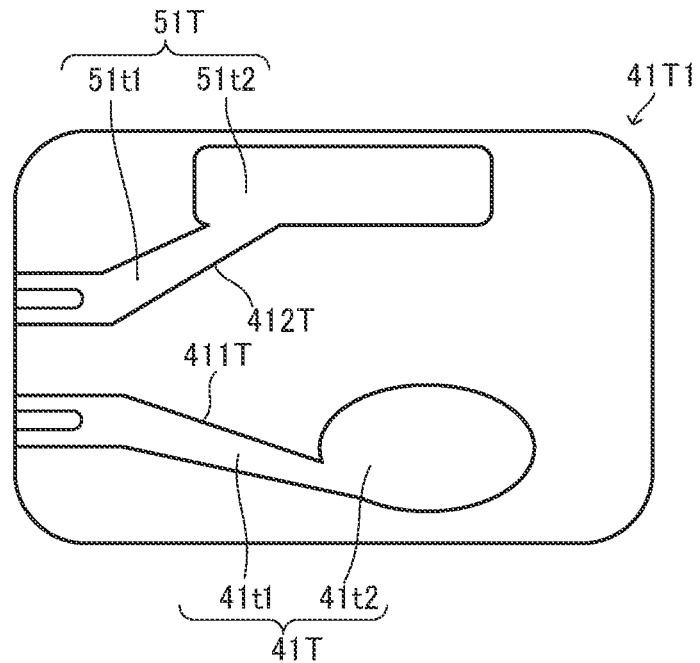
FIG. 14A is a schematic diagram of a first electrode and a third electrode.

As shown in FIG. 14A, first electrode 41T is a portion surrounded by slit 411T formed in transparent conductive film 41T1.

First electrode 41T includes connecting portion 41t1 and voltage application portion 41t2. Voltage application portion 41t2 is a portion corresponding to first region 3T. Such first electrode 41T is substantially similar to first electrode 41 of the above-described Embodiment 1.

One end of connecting portion 41t1 is exposed to the outside at first portion 21T of the outer peripheral surface of lens 2T. First portion 21T is present in one-side half in the width direction of the outer peripheral surface of lens 2T.

Insulating Film

Insulating film 43T and insulating film 45T are similar to those in the case of the above-described Embodiment 1.

First Liquid Crystal Module

First liquid crystal module 44T includes alignment film 44T1, first liquid crystal layer 44T2, alignment film 44T3, and the like, in order from the rear side. The configuration of such first liquid crystal module 44T is similar to that in the case of the above-described Embodiment 1.

Second Electrode

Figure 14B:
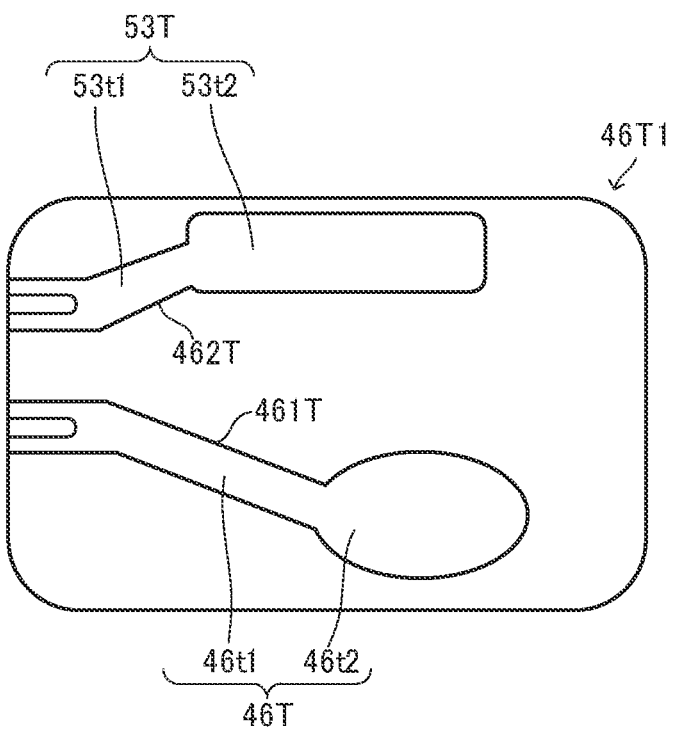
FIG. 14B is a schematic diagram of a second electrode and a fourth electrode.

As shown in FIG. 14B, second electrode 46T is a portion surrounded by slit 461T formed in transparent conductive film 46T1.

Second electrode 46T includes connecting portion 46t1 and voltage application portion 46t2. Voltage application portion 46t2 is a portion corresponding to first region 3T.

One end of connecting portion 46t1 is exposed to the outside at second portion 22T of the outer peripheral surface of lens 2T. Second portion 22T is present in the one-side half in the width direction of the outer peripheral surface of lens 2T. Such second electrode 46T is substantially similar to second electrode 48 of the above-described Embodiment 1.

The configuration of such first property changeable portion 40T is substantially similar to that of first property changeable portion 40 of the above-described Embodiment 1. Therefore, the description of first property changeable portion 40 of Embodiment 1 may be read as the description of the configuration of first property changeable portion 40T as needed.

Second Substrate

Second substrate 47T is disposed at the frontmost side (far side from the user) in lens 2T. In the case of the present embodiment, second substrate 47T has a configuration in which second diffraction structure 33c is omitted from second substrate 33 of the above-described Embodiment 1. The other configuration of second substrate 47T is substantially similar to that of second substrate 33 of Embodiment 1. Therefore, the description of second substrate 33 of Embodiment 1 may be read as the description of the configuration of second substrate 47T as needed.

Second Region

As shown in FIG. 13, second region 5T is disposed above the eye of the user in the worn state. Such second region 5T may have an optical power that makes it easy to see an object at a long distance in a state where a voltage is applied to second property changeable portion 50T. The optical power of third region 6T may have an optical power that makes it easy to see an object at an intermediate distance.

As shown in FIG. 12, second region 5T includes first substrate 31T, second property changeable portion 50T, second substrate 47T, and the like, in order from the rear side (lower side in FIG. 12). First substrate 31T and second substrate 47T are elements shared by second region 5T and first region 3T. The elements of second region 5T have translucency for visible light.

Second region 5T has substantially the same optical power as the optical power of third region 6T in the voltage non-application state where no voltage is applied to second property changeable portion 50T.

On the other hand, second region 5T has an optical power different from the optical power of third region 6T or the optical power of first region 3T in the voltage application state where a voltage is applied to second property changeable portion 50T.

Second Property Changeable Portion

Second property changeable portion 50T includes above-described second diffraction structure 33t, third electrode 51T, insulating film 43T, second liquid crystal module 52T, insulating film 45T, fourth electrode 53T, and the like, in order from the rear side.

Insulating Film

Insulating film 43T and insulating film 45T are elements shared with first property changeable portion 40T.

Third Electrode

As shown in FIG. 14A, third electrode 51T is a portion surrounded by slit 412T formed in transparent conductive film 41T1.

Third electrode 51T includes connecting portion 51t1 and voltage application portion 51t2. Voltage application portion 51t2 is a portion corresponding to second region 5T. Such third electrode 51T is substantially similar to first electrode 41 of the above-described Embodiment 1.

One end of connecting portion 51t1 is exposed to the outside at third portion 23T of the outer peripheral surface of lens 2T. Third portion 23T is present in the one-side half in the width direction of the outer peripheral surface of lens 2T.

Second Liquid Crystal Module

Second liquid crystal module 52T includes alignment film 52T1, second liquid crystal layer 52T2, alignment film 52T3, and the like, in order from the rear side. The configuration of such second liquid crystal module 52T is similar to that in the case of the above-described Embodiment 1.

Fourth Electrode

As shown in FIG. 14B, fourth electrode 53T is a portion surrounded by slit 462T formed in transparent conductive film 46T1.

Fourth electrode 53T includes connecting portion 53t1 and voltage application portion 53t2. Voltage application portion 53t2 is a portion corresponding to second region 5T.

One end of connecting portion 53t1 is exposed to the outside at fourth portion 24T of the outer peripheral surface of lens 2T. Fourth portion 24T is present in the one-side half in the width direction of the outer peripheral surface of lens 2T. First portion 21T, second portion 22T, third portion 23T, and fourth portion 24T do not face each other in the thickness direction. Such fourth electrode 53T is substantially similar to first electrode 41 of the above-described Embodiment 1. The other configuration of second property changeable portion 50T is substantially similar to that of the above-described first property changeable portion 40T.

Third Region

Third region 6T includes first substrate 31T, property fixed portion 61T, second substrate 47T, and the like, in order from the rear side. First substrate 31T and second substrate 47T are elements shared by first region 3T and second region 5T. Third region 6T may have a predetermined optical power. The optical power of third region 6T is always constant.

Property Fixed Portion

Property fixed portion 61T includes transparent conductive film 41T1, insulating film 43T, adhesion layer 62T, insulating film 45T, second electrode 46T, and the like, in order from the rear side. First electrode 41T, insulating film 43T, insulating film 45T, and transparent conductive film 46T1 are elements shared with first region 3T and second region 5T. The configuration of adhesion layer 62T is substantially similar to adhesion layer 61 of the above-described Embodiment 1. Therefore, the description of adhesion layer 61 of the above-described Embodiment 1 may be read as the description of the configuration of adhesion layer 62T as needed.

Control Section

In the case of the present reference example, control section 17 (see FIG. 2) includes, for example, a control circuit (not shown) that controls application of a voltage to at least one of first property changeable portion 40T (specifically, first electrode 41T and second electrode 46T) of lens 2T and second property changeable portion 50T (specifically, third electrode 51T and fourth electrode 53T) of lens 2T based on detection information of detection section 16 (see FIG. 2).

When detection information of detection section 16 is information indicating to stop application of a voltage to first property changeable portion 40T and second property changeable portion 50T, control section 17 stops application of a voltage to first property changeable portion 40T and second property changeable portion 50T.

When detection information of detection section 16 is information indicating to apply a voltage to only first property changeable portion 40T, control section 17 applies a voltage to only first property changeable portion 40T.

When detection information of detection section 16 is information indicating to apply a voltage to only second property changeable portion 50T, control section 17 applies a voltage to only second property changeable portion 50T.

When detection information of detection section 16 is information indicating to apply a voltage to first property changeable portion 40T and second property changeable portion 50T, control section 17 applies a voltage to first property changeable portion 40T and second property changeable portion 50T.

Modification 1 of Reference Example 1

Figure 15A:
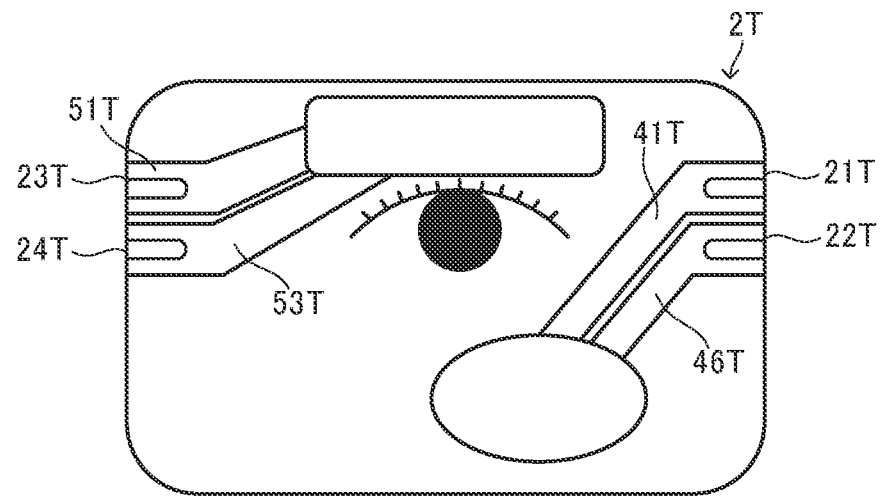
FIG. 15A is a front schematic diagram of a lens according to Modification 1 of Reference Example 1.

FIG. 15A illustrates Modification 1 of Reference Example 1.

In the case of the present modification, first electrode 41T is exposed to the outside at first portion 21T on the outer peripheral surface of lens 2T. First portion 21T is present in one-side half in the width direction of the outer peripheral surface of lens 2T. The one-side half in the width direction may be a half closer to an associated one of the pair of temples 14a, 14b in a state where lens 2 is held by frame 1. Alternatively, the one-side half in the width direction may be a half closer to bridge 13a in a state where lens 2 is held by frame 1.

Second electrode 46T is exposed to the outside at second portion 22T on the outer peripheral surface of lens 2T. Second portion 22T is present in the one-side half in the width direction of the outer peripheral surface of lens 2T.

Third electrode 51T is exposed to the outside at third portion 23T on the outer peripheral surface of lens 2T. Third portion 23T is present in the other-side half in the width direction of the outer peripheral surface of lens 2T.

Fourth electrode 53T is exposed to the outside at fourth portion 24T on the outer peripheral surface of lens 2T. Fourth portion 24T is present in the other-side half in the width direction of the outer peripheral surface of lens 2T. First portion 21T, second portion 22T, third portion 23T, and fourth portion 24T do not face each other in the thickness direction.

Modification 2 of Reference Example 1

Figure 15B:
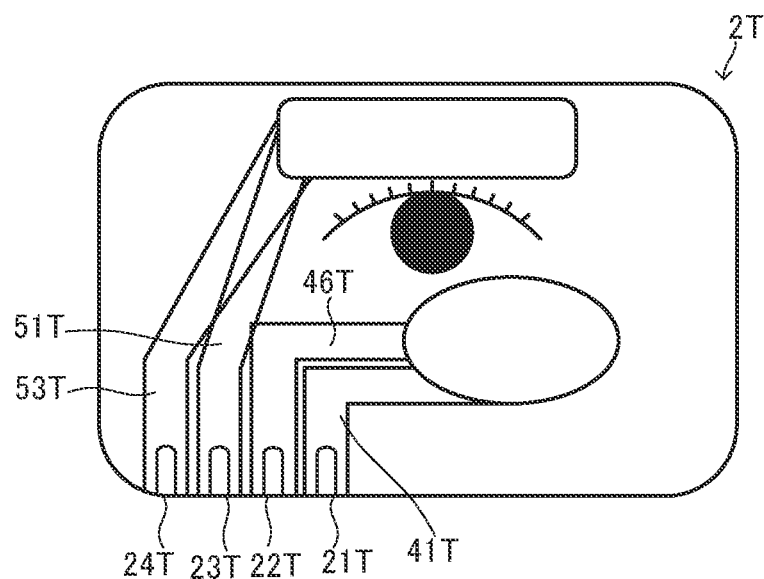
FIG. 15B is a front schematic diagram of a lens according to Modification 2 of Reference Example 1.

Modification 2 of Reference Example 1 will be described with reference to FIG. 15B.

In the case of the present modification, first electrode 41T is exposed to the outside at first portion 21T on the outer peripheral surface of lens 2T. First portion 21T is present in the lower half of the outer peripheral surface of lens 2T.

Second electrode 46T is exposed to the outside at second portion 22T on the outer peripheral surface of lens 2T. Second portion 22T is present in the lower half of the outer peripheral surface of lens 2T.

Third electrode 51T is exposed to the outside at third portion 23T on the outer peripheral surface of lens 2T. Third portion 23T is present in the lower half of the outer peripheral surface of lens 2T.

Fourth electrode 53T is exposed to the outside at fourth portion 24T on the outer peripheral surface of lens 2T. Fourth portion 24T is present in the lower half of the outer peripheral surface of lens 2T. First portion 21T, second portion 22T, third portion 23T, and fourth portion 24T do not face each other in the thickness direction.

Modification 3 of Reference Example 1

Figure 15C:
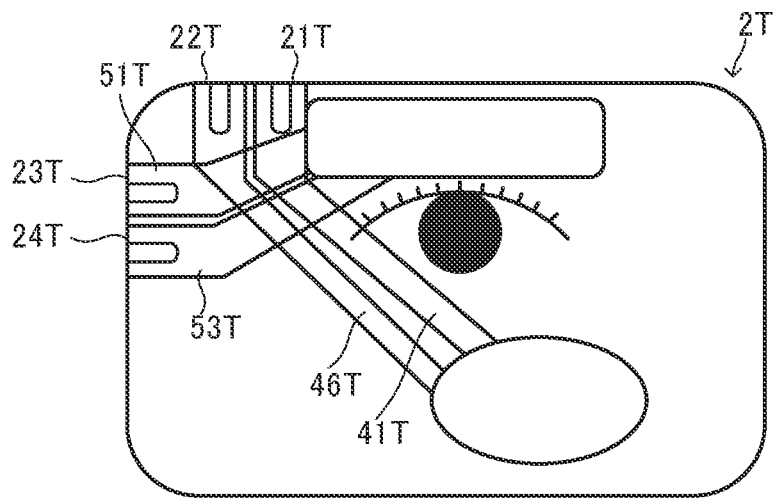
FIG. 15C is a front schematic diagram of a lens according to Modification 3 of Reference Example 1.

Modification 3 of Reference Example 1 will be described with reference to FIG. 15C.

In the case of the present reference example, first electrode 41T and third electrode 51T are provided in different layers, and an insulating layer is provided between first electrode 41T and third electrode 51T, which is not shown in the drawing. In addition, second electrode 46T and fourth electrode 53T are provided in different layers, and an insulating layer is also provided between second electrode 46T and fourth electrode 53T. With such a configuration, arrangement as shown in FIG. 15C is possible.

Specifically, first electrode 41T is exposed to the outside at first portion 21T on the outer peripheral surface of lens 2T. First portion 21T is present in the upper half of the outer peripheral surface of lens 2T.

Second electrode 46T is exposed to the outside at second portion 22T on the outer peripheral surface of lens 2T. Second portion 22T is present in the upper half of the outer peripheral surface of lens 2T.

Third electrode 51T is exposed to the outside at third portion 23T on the outer peripheral surface of lens 2T. Third portion 23T is present in one-side half in the width direction of the outer peripheral surface of lens 2T.

Fourth electrode 53T is exposed to the outside at fourth portion 24T on the outer peripheral surface of lens 2T. Fourth portion 24T is present in the one-side half in the width direction of the outer peripheral surface of lens 2T. First portion 21T, second portion 22T, third portion 23T, and fourth portion 24T do not face each other in the thickness direction.

Modification 4 of Reference Example 1

Figure 15D:
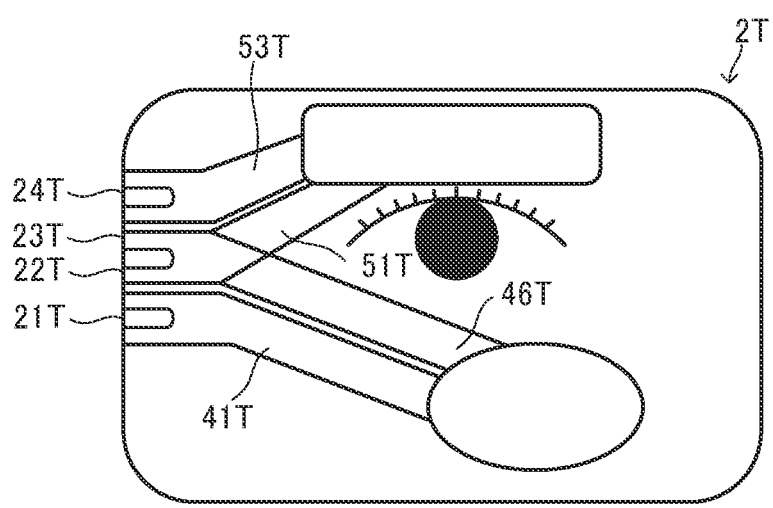
FIG. 15D is a front schematic diagram of a lens according to Modification 4 of Reference Example 1.

Modification 4 of Reference Example 1 will be described with reference to FIG. 15D.

In the case of the present modification, first electrode 41T is exposed to the outside at first portion 21T on the outer peripheral surface of lens 2T. First portion 21T is present in one-side half in the width direction of the outer peripheral surface of lens 2T.

Second electrode 46T is exposed to the outside at second portion 22T on the outer peripheral surface of lens 2T. Second portion 22T is present in the one-side half in the width direction of the outer peripheral surface of lens 2T. Second portion 22T does not face first portion 21T in the thickness direction.

Third electrode 51T is exposed to the outside at third portion 23T on the outer peripheral surface of lens 2T. Third portion 23T is present in the one-side half in the width direction of the outer peripheral surface of lens 2T. Third portion 23T faces second portion 22T in the thickness direction.

Fourth electrode 53T is exposed to the outside at fourth portion 24T on the outer peripheral surface of lens 2T. Fourth portion 24T is present in the one-side half in the width direction of the outer peripheral surface of lens 2T. Fourth portion 24T does not face first portion 21T, second portion 22T, or third portion 23T in the thickness direction.

In the case of the present modification as described above, one of first portion 21T and second portion 22T and one of third portion 23T and fourth portion 24T face each other in the thickness direction. The other one of first portion 21T and second portion 22T and the other one of third portion 23T and fourth portion 24T do not face each other in the thickness direction.

Modifications 5 to 8 of Reference Example 1

Figure 15E:
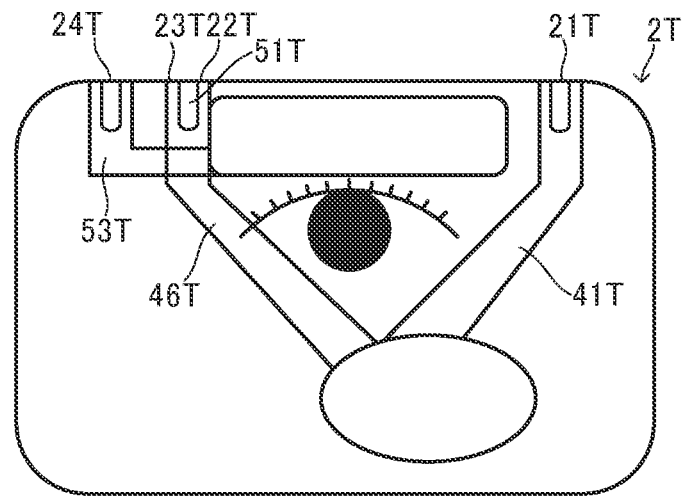
FIG. 15E is a front schematic diagram of a lens according to Modification 5 of Reference Example 1.

Modification 5 of Reference Example 1 will be described with reference to FIG. 15E.

Figure 15F:
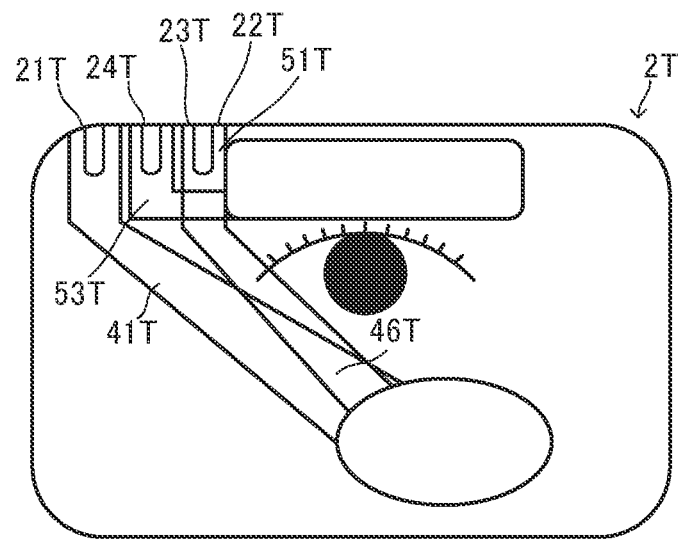
FIG. 15F is a front schematic diagram of a lens according to Modification 6 of Reference Example 1.

In the case of the present modification, first electrode 41T is exposed to the outside at first portion 21T on the outer peripheral surface of lens 2T. First portion 21T is present in the upper half of the outer peripheral surface of lens 2T. The position of first portion 21T may be in one-side half (see FIG. 15E) or in the other-side half in the width direction (see FIG. 15F) in the upper half of the outer peripheral surface of lens 2T.

Second electrode 46T is exposed to the outside at second portion 22T on the outer peripheral surface of lens 2T. Second portion 22T is present in the upper half of the outer peripheral surface of lens 2T. Second portion 22T does not face first portion 21T in the thickness direction.

Third electrode 51T is exposed to the outside at third portion 23T on the outer peripheral surface of lens 2T. Third portion 23T is present in the upper half of the outer peripheral surface of lens 2T. Third portion 23T faces second portion 22T in the thickness direction.

Fourth electrode 53T is exposed to the outside at fourth portion 24T on the outer peripheral surface of lens 2T. Fourth portion 24T is present in the upper half of the outer peripheral surface of lens 2T. Fourth portion 24T does not face first portion 21T, second portion 22T, or third portion 23T in the thickness direction.

Figure 15G:
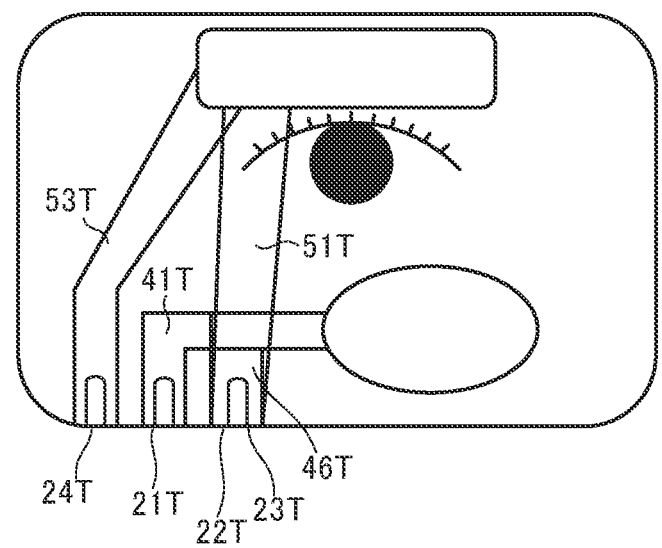
FIG. 15G is a front schematic diagram of a lens according to Modification 7 of Reference Example 1.

The positions of first portion 21T, second portion 22T, third portion 23T, and fourth portion 24T may be, for example, arrangement shown in FIG. 15G. Specifically, in the case of the structure shown in FIG. 15G, first portion 21T, second portion 22T, third portion 23T, and fourth portion 24T are each present in the lower half of the outer peripheral surface of lens 2T. Second portion 22T faces third portion 23T in the thickness direction.

Figure 15H:
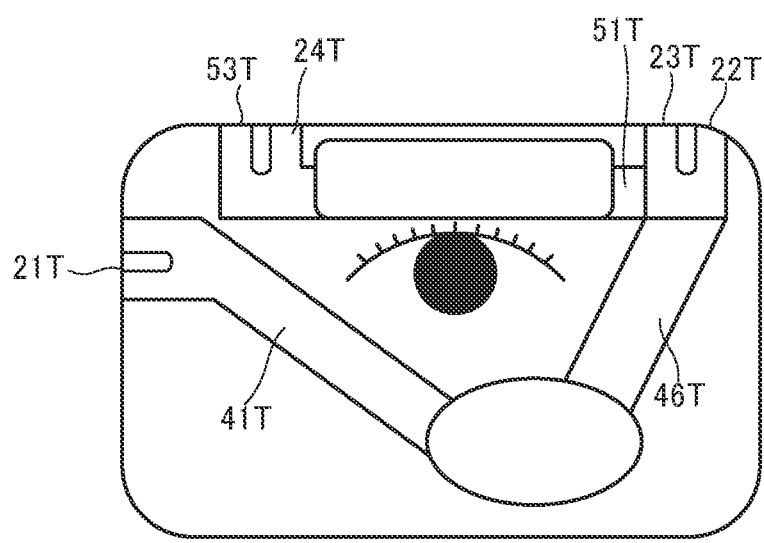
FIG. 15H is a front schematic diagram of a lens according to Modification 8 of Reference Example 1.

The positions of first portion 21T, second portion 22T, third portion 23T, and fourth portion 24T may be, for example, arrangement shown in FIG. 15H. Specifically, in the case of the structure shown in FIG. 15H, first portion 21T is present in one-side half in the width direction of the outer peripheral surface of lens 2T.

Second portion 22T, third portion 23T, and fourth portion 24T are each present in the upper half of the outer peripheral surface of lens 2T. Second portion 22T faces third portion 23T in the thickness direction.

APPENDIX

A lens according to the above-described Reference Example 1 and the modifications of Reference Example 1 includes a transparent first substrate, a transparent second substrate provided so as to face the first substrate in a thickness direction of the first substrate, a first optical property changeable portion that is provided between the first substrate and the second substrate and in which an optical property of the first optical property changeable portion is changed by electrical control, and a second optical property changeable portion that is provided between the first substrate and the second substrate at a position that does not face the first optical property changeable portion in the thickness direction and in which an optical property of the second optical property changeable portion is changed by electrical control.

The above-described embodiments and modifications may be implemented in combination as needed without a technical contradiction. The configurations of the first electrode, second electrode, third electrode, and fourth electrode may be interchanged as needed without a technical contradiction.

The disclosure of Japanese Patent Application No. 2018-185321, filed Sep. 28, 2018 including the specification, drawings and abstract is incorporated herein by reference in its entirety.

INDUSTRIAL APPLICABILITY

The present invention is not limited to electronic glasses and suitably usable in various eyewears.

REFERENCE SIGNS LIST

G Electronic glasses
1 Frame
11 Front
12 Rim
13a Bridge
13b Nose pad
14a, 14b Temple
15 Casing
16 Detection section
17 Control section
18 Power supply
19 Wire
2, 2A, 2B, 2C, 2D Lens
2Z Lens blank
21 First portion
22 Second portion
23 Third portion
24 Fourth portion
25 Blank portion
3, 3D First region
31, 31A First substrate 31c, 31d First diffraction structure
311 Convex portion
312 Ridge
32, 32A Intermediate substrate
33, 33A Second substrate
33c, 33d Second diffraction structure
331 Convex portion
332 Ridge
40 First property changeable portion
41, 41B, 41C First electrode
411 Transparent conductive film
41a Slit
41d Voltage application portion
41e Connecting portion
41f Thick portion
42, 47 Insulating film
43 First liquid crystal module
44, 46 Alignment film
45 First liquid crystal layer
48, 48B, 48C Second electrode
481 Transparent conductive film
48a Slit
48d Voltage application portion
48e Connecting portion
48f Thick portion
50, 50D Second property changeable portion
51, 51B, 51C Third electrode
511 Transparent conductive film
51a Slit
51d Voltage application portion
51e Connecting portion
51f Thick portion
52 Second liquid crystal module
53, 57 Insulating film
54, 56 Alignment film
55 Second liquid crystal layer
58, 58B, 58C Fourth electrode
581 Transparent conductive film
58a Slit
58d Voltage application portion
58e Connecting portion
58f Thick portion
6, 6D Second region
60 First property fixed portion
70 Second property fixed portion
61, 62 Adhesion layer
2T Lens
21T First portion
22T Second portion
23T Third portion
24T Fourth portion
3T First region
31T First substrate
31t First diffraction structure
33t Second diffraction structure
40T First property changeable portion
41T First electrode
41T1 Transparent conductive film
411T Slit
412T Slit
41t1 Connecting portion
41t2 Voltage application portion
43T Insulating film
44T First liquid crystal module
44T1 Alignment film
44T2 First liquid crystal layer
44T3 Alignment film
45T Insulating film
46T Second electrode
46T1 Transparent conductive film
461T Slit
462T Slit
46t1 Connecting portion
46t2 Voltage application portion
47T Second substrate
5T Second region
50T Second property changeable portion
51T Third electrode
51t1 Connecting portion
51t2 Voltage application portion
52T Second liquid crystal module
52T1 Alignment film
52T2 Second liquid crystal layer
52T3 Alignment film
53T Fourth electrode
53t1 Connecting portion
53t2 Voltage application portion
6T Third region
61T Property fixed portion
62T Adhesion layer

What is claimed is:

1. A lens, comprising:
a first substrate which is transparent;
a second substrate provided so as to face the first substrate in a thickness direction of the first substrate, the second substrate being transparent;
a first optical property changeable portion that is provided between the first substrate and the second substrate, wherein an optical property of the first optical property changeable portion is changed by electrical control; and
a second optical property changeable portion provided between the first substrate and the second substrate and provided so as to be shifted from the first optical property changeable portion in the thickness direction, wherein an optical property of the second optical property changeable portion is changed by electrical control.

2. The lens according to claim 1, wherein the second optical property changeable portion faces the first optical property changeable portion in the thickness direction.

3. The lens according to claim 2, wherein the first optical property changeable portion and the second optical property changeable portion have different shapes in front view.

4. The lens according to claim 1, wherein:
the first optical property changeable portion has a first optical power in a state where a voltage is applied to the first optical property changeable portion;
the second optical property changeable portion has a second optical power greater in absolute value than the first optical power in a state where a voltage is applied to the second optical property changeable portion; and
an area of the first optical property changeable portion in front view is greater than an area of the second optical property changeable portion in front view.

5. The lens according to claim 2, wherein the first optical property changeable portion and the second optical property changeable portion have a same shape in front view.

6. The lens according to claim 1, further comprising a third substrate provided between the first optical property changeable portion and the second optical property changeable portion, wherein:
the first optical property changeable portion includes a first diffraction structure that diffracts incident light, and a first liquid crystal layer that faces the first diffraction structure in the thickness direction;
the second optical property changeable portion includes a second diffraction structure that diffracts incident light, and a second liquid crystal layer that faces the second diffraction structure in the thickness direction;
the first diffraction structure is provided on a side surface of the first substrate and the third substrate; and
the second diffraction structure is provided on a side surface of the second substrate and the third substrate.

7. The lens according to claim 6, wherein:
the first diffraction structure is provided on the third substrate that faces the first substrate; and
the second diffraction structure is provided on the third substrate that faces the second substrate.

8. The lens according to claim 6 or 7, wherein:
the first optical property changeable portion has a first electrode and a second electrode that apply voltage to the first liquid crystal layer;
the second optical property changeable portion has a third electrode and a fourth electrode that apply voltage to the second liquid crystal layer; and
at least one of the first electrode or the second electrode faces at least one of the third electrode or the fourth electrode in the thickness direction.

9. The lens according to claim 8, wherein:
one electrode of the first electrode and the second electrode faces one electrode of the third electrode and the fourth electrode in the thickness direction;
another electrode of the first electrode and the second electrode faces another electrode of the third electrode and the fourth electrode in the thickness direction.

10. The lens according to claim 8, wherein:
the first electrode and the third electrode face each other in the thickness direction; and
the second electrode and the fourth electrode face each other in the thickness direction.

11. The lens according to claim 8, wherein the first electrode and the second electrode and the third electrode and the fourth electrode make up a single electrode.

12. A lens blank, comprising:
a blank portion; and
the lens according to claim 1, integrally formed with the blank portion.

13. An eyewear, comprising:
the lens according to claim 1;
a frame that holds the lens; and
a control section that controls a voltage applied to the first optical property changeable portion and the second optical property changeable portion.

14. The eyewear according to claim 13, wherein the control section controls the voltage applied to the first optical property changeable portion and the voltage applied to the second optical property changeable portion independently of each other.

* * * * *